(12) United States Patent
Makhija et al.

(10) Patent No.: US 12,504,956 B2
(45) Date of Patent: Dec. 23, 2025

(54) DEVELOPMENT APPLICATION FRAMEWORK FOR CODELESS DEVELOPMENT OF ENTERPRISE APPLICATION

(71) Applicant: NB Ventures, Inc., Clark, NJ (US)

(72) Inventors: Subhash Makhija, Westfield, NJ (US); Huzaifa Shabbir Matawala, East Brunswick, NJ (US); Wael Gendy Yousef Abdo, Bridgewater, NJ (US); Shivendra Singh Malik, Vasco-da-Gama (IN); Vinay Mathur, Summit, NJ (US); Murali Vajjiravel, Lincroft, NJ (US)

(73) Assignee: NB Ventures, Inc.

( * ) Notice: Subject to any disclaimer, the term of this patent is extended or adjusted under 35 U.S.C. 154(b) by 363 days.

(21) Appl. No.: 18/090,824

(22) Filed: Dec. 29, 2022

(65) Prior Publication Data
US 2023/0136289 A1 May 4, 2023

Related U.S. Application Data

(62) Division of application No. 17/139,157, filed on Dec. 31, 2020, now Pat. No. 11,669,310.

(51) Int. Cl.
| | |
|---|---|
| *G06F 8/36* | (2018.01) |
| *G06F 9/54* | (2006.01) |
| *G06F 16/245* | (2019.01) |
| *G06N 5/02* | (2023.01) |
| *G06N 20/00* | (2019.01) |
| *G06Q 10/087* | (2023.01) |

(52) U.S. Cl.
CPC ............... *G06F 8/36* (2013.01); *G06F 9/541* (2013.01); *G06F 9/547* (2013.01); *G06F 16/245* (2019.01); *G06N 5/02* (2013.01); *G06N 20/00* (2019.01); *G06Q 10/087* (2013.01)

(58) Field of Classification Search
CPC .......... G06F 8/36; G06F 16/245; G06F 9/541; G06F 9/547; G06N 20/00; G06N 5/02; G06Q 10/087
USPC ..................................................... 717/107
See application file for complete search history.

(56) References Cited

U.S. PATENT DOCUMENTS

| | | | |
|---|---|---|---|
| 10,467,062 B1 * | 11/2019 | Park .......................... G06F 8/43 |
| 2010/0221694 A1 * | 9/2010 | Moshenberg ............ G09B 7/04 434/362 |
| 2013/0268639 A1 * | 10/2013 | Myrah ...................... G06F 8/76 709/221 |
| 2018/0342317 A1 * | 11/2018 | Skirble ............. G06K 19/06037 |
| 2020/0092178 A1 * | 3/2020 | Nelson ............. G06Q 10/06316 |
| 2020/0133640 A1 * | 4/2020 | Thiru ........................ G06F 8/22 |

(Continued)

*Primary Examiner* — Bradford F Wheaton
(74) *Attorney, Agent, or Firm* — David M. Breiner; BrownWinick Law Firm

(57) ABSTRACT

The present invention provides a platform architecture, a development application framework and a method for codeless development of one or more Supply chain management (SCM) enterprise application. The invention includes a layered platform architecture for supporting and executing development of SCM applications. The platform and method provide interaction of an SCM application user, a citizen developer user and a platform developer user with one or more layers of the platform architecture for codeless development of the SCM applications.

20 Claims, 27 Drawing Sheets

(56) References Cited

U.S. PATENT DOCUMENTS

2020/0160458 A1\* 5/2020 Bodin .................... G06F 40/30
2021/0182996 A1\* 6/2021 Cella ................. G06Q 10/0637

\* cited by examiner

DEVELOPMENT APPLICATION FRAMEWORK FOR CODELESS DEVELOPMENT OF ENTERPRISE APPLICATION

CROSS-REFERENCE TO RELATED APPLICATIONS

This application is a divisional application of U.S. patent application Ser. No. 17/139,157 which was filed with the United States Patent and Trademark Office on Dec. 31, 2020, the entire contents of which is herein incorporated by reference.

BACKGROUND

1. Technical Field

The present invention relates generally to codeless development of enterprise applications. More particularly, the invention relates to platform architecture, systems and methods for development of an enterprise application.

2. Description of the Prior Art

Depending on the operational requirement of an organization, an enterprise application includes certain capabilities to meet those requirements. However, customization of enterprise application depending on these requirements is a tedious task. Moreover, it is impractical for a service provider to restructure the enterprise application every time a new entity raises a distinct operational requirement.

The operational requirements of every organization are unique. Depending on the task to be accomplished, the organization may wish to modify the data flow through the enterprise application. Most of the existing applications suffer due to use of a relational database (RDBMS) as part of the architecture and the heavy reliance on the underlying RDBMS storage engine to provide transactional support. RDBMS results in a big monolith at the storage level. The use of RDBMS to build logics with stored procedures, database triggers etc., cause inherent technical issues resulting in inefficient functioning of complex application functions.

Generally, a developer is entrusted with the task of modifying the underlining code of the enterprise application to accommodate the operational requirement of the organization. However, there are technical and practical problems is implementing a change to the basic structure. Firstly, modifying a set of codes to introduce a new feature or operation may break another function of the enterprise application. Secondly, the amount of time it consumes for carrying out any change to the structure of the enterprise application. The change may also requires halting the execution of multiple processes in the enterprise application. Thirdly, depending on the function of the enterprise application, defining a new process flow in a complex application such as a procurement or supply chain application without disturbing the existing flows is impractical and nearly impossible. Further, any change requires a skilled developer to make changes to the complex enterprise application scenarios at system backend which may be extremely tedious considering the developer may understand only certain sections of the entire enterprise application. Moreover, the front-end requirements of the end user may not be understood to a developer in case the user requests certain changes to the flow and structure of one or more functions/ sub-applications of the enterprise application. Every end user has a different operational requirement depending on industry verticals and variations based on region of operation. It is impractical to accommodate to such requirements through the existing enterprise applications.

Even with codeless development of applications to overcome some of the above problems the architecture remains unsupportive in multiple aspects including working with different data abstraction. NOSQL and SQL ecosystem have their own data abstraction advantages in managing large scale enterprise data. Use of a single data abstraction to resolve data needs considerably slows down the operations when the scale of the system grows multifold. Moreover, the data abstraction has their own limitations. While NOSQL is easy to implement, incorrect selection of data abstraction leads to system issues requiring a designer to re-implement the ecosystem itself. On the other hand, SQL is flexible, but it fails in large scale implementations. Even with codeless development integration of multiple functions while dealing with distinct data abstractions without impacting functionality of the applications is cumbersome to design. The basic structure of applications supporting such development have inherent issues due to the complexity of the functions to be executed in supply chain management applications while dealing with data abstraction. Moreover, some application may use reusable code objects for executing codeless development, but these codes are restricted in their functionality due to underlining architecture. None of the prior arts address the structural complexity and technical issues in executing functions through an enterprise application that are supported by existing architecture designs and infrastructure.

In view of the above problems, there is a need for a platform architecture, system and method for development of an enterprise application that can overcome the problems associated with the prior arts.

SUMMARY

According to an embodiment, the present invention provides a platform architecture for codeless development of one or more SCM application. The architecture includes a plurality of configurable components interacting with each other in a layered architecture, a customization layer configured to customize the one or more SCM application based on at least one operation to be executed, an application layer interacting with the customization layer through one or more configurable components of the plurality of configurable components wherein the application layer is configured to organize at least one application service of the one or more SCM application, a shared framework layer communicating with the application layer through one or more configurable components of the plurality of configurable components wherein the shared framework layer is configured to fetch shared data objects for enabling execution of the at least one application service. The architecture includes a foundation layer configured for infrastructure development through one or more configurable components of the plurality of configurable components wherein the foundation layer communicates with the shared framework layer for enabling fetching of shared data objects, a data layer communicating with the foundation layer through one or more configurable components of the plurality of configurable components wherein the data layer is configured to manage database native queries mapped to the at least one operation and a process orchestrator configured to enable interaction of the plurality of configurable components in the layered architecture for executing the at least one operation and develop the one or more SCM application.

In an embodiment, the present invention provides a method of codeless development of one or more SCM application through a platform architecture. The method includes receiving at least one operation at a server for execution, invoking a customization layer configured to customize the one or more SCM application based on the at least one operation to be executed, organizing at least one application service of the one or more SCM application by an application layer wherein the application layer interacts with the customization layer through a plurality of configurable components. The method also includes fetching shared data objects by a shared framework layer for enabling execution of the at least one application service wherein the shared framework layer communicates with the application layer through the plurality of configurable components, developing infrastructure by a foundation layer through the plurality of configurable components wherein the foundation layer communicates with the shared framework layer to enable fetching of shared data objects, managing database native queries mapped to the at least one operation by a data layer wherein the data layer communicates with the foundation layer through the plurality of configurable components and developing the one or more SCM application by the plurality of configurable components interacting through a process orchestrator for executing the at least one operation.

In an embodiment, the present invention provides a development application framework for codeless development of one or more SCM application. The application framework includes an application user interface (UI) of a development application having a plurality of data objects configured to trigger a plurality of configurable component of a layered platform architecture to structure one or more SCM application, an entity configurator for defining a plurality of configuration parameters to create the SCM application, a database query engine configured to fetch data from a plurality of distinct databases, a configurable data source repository for storing a plurality of API configured to be invoked dynamically by a user through the interface for creating the SCM application, an expression builder configured for customizing application processing logic for execution of at least one SCM application operation and a plugin creator engine configured to implement a plurality of reusable plugin for enriching the layered platform architecture.

In an embodiment, the present invention provides a method of codeless development of one or more SCM application by a development application framework. The method includes receiving at a server, a request to execute at least one SCM application operation, identifying by an AI engine coupled to a processor, a plurality of configurable components of a layered platform architecture for structuring one or more SCM application to execute the SCM operation. The method also includes defining by an entity configurator, a plurality of configuration parameters to create the SCM application, fetching data from a plurality of distinct databases by a database query engine. The method further includes registering a plurality of API for storing at a configurable data source repository wherein the API are configured to be invoked dynamically by a SCM application user through an SCM application user interface (UI) for creating the SCM application, customizing application processing logic by an expression builder for execution of at least one SCM application operation, implementing a plurality of reusable plugin by a plugin creator engine for enriching the layered platform architecture, and developing the one or more SCM application by the plurality of configurable components interacting through a process orchestrator for executing the at least one SCM application operation.

In an advantageous aspect, the platform architecture is a layered architecture structured to execute a plurality of complex SCM enterprise application operations in an organized and less time-consuming manner due to faster processing as the underlining architecture is appropriately defined to execute the operations through shortest path. Further, the platform architecture enables secured data flow through applications and resolution of code break issues without affecting neighboring functions or application.

In another advantageous aspect, the present invention utilizes Machine Learning algorithms, prediction data models, artificial intelligence-based process orchestrator for execution of one or more SCM application operations.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
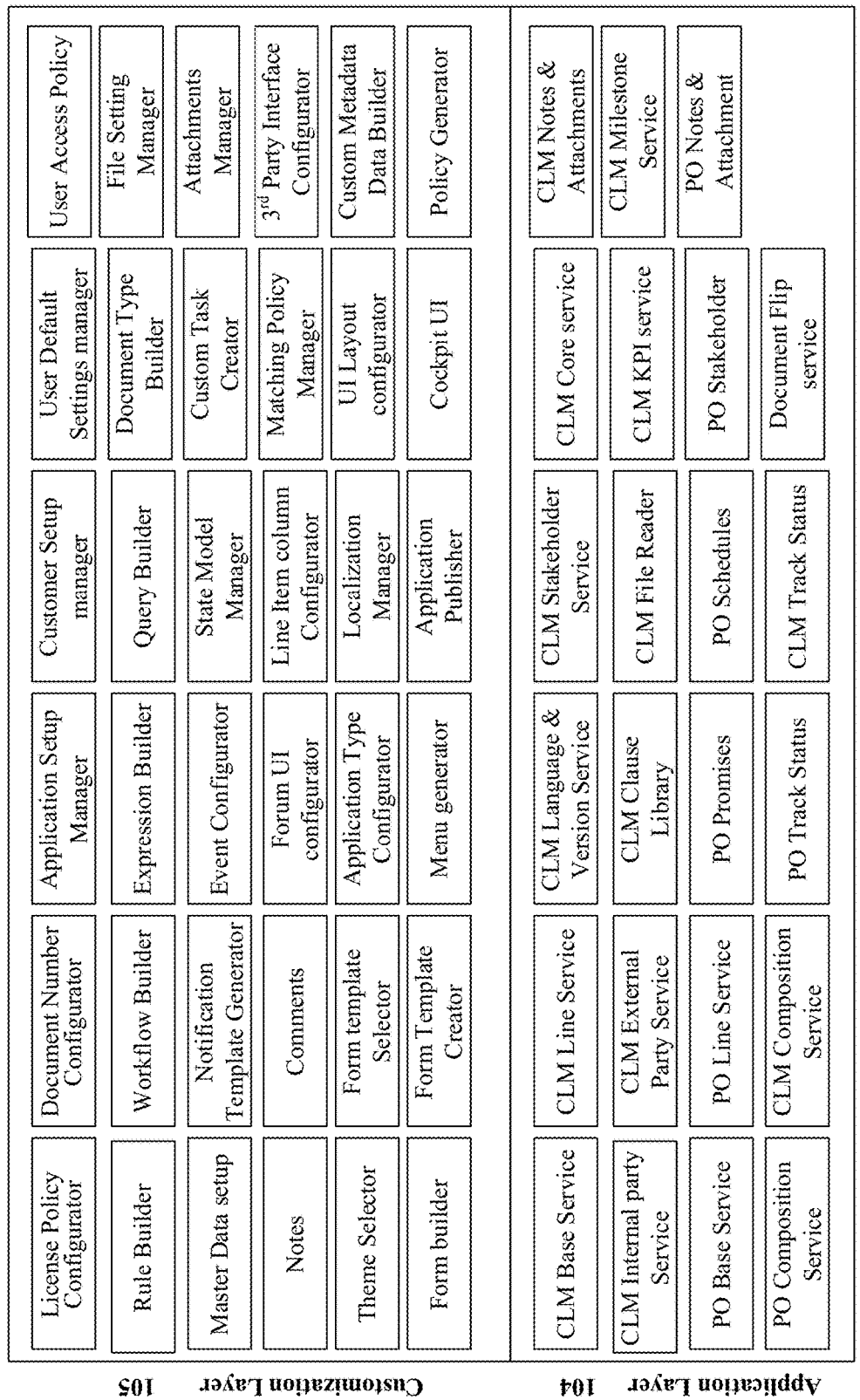
FIGS. 1 and 1A is a layered platform architecture diagram with configurable components for codeless development of one or more SCM enterprise application in accordance with an embodiment of the invention.

Described herein are the various embodiments of the present invention, which includes platform architecture, development application and method for codeless development of enterprise application including supply chain management applications.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "customization layer," "application layer," "foundation layer" or "data layer," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to platform architecture, development application framework and method for codeless development of enterprise applications including supply chain management application.

Figure 1A:
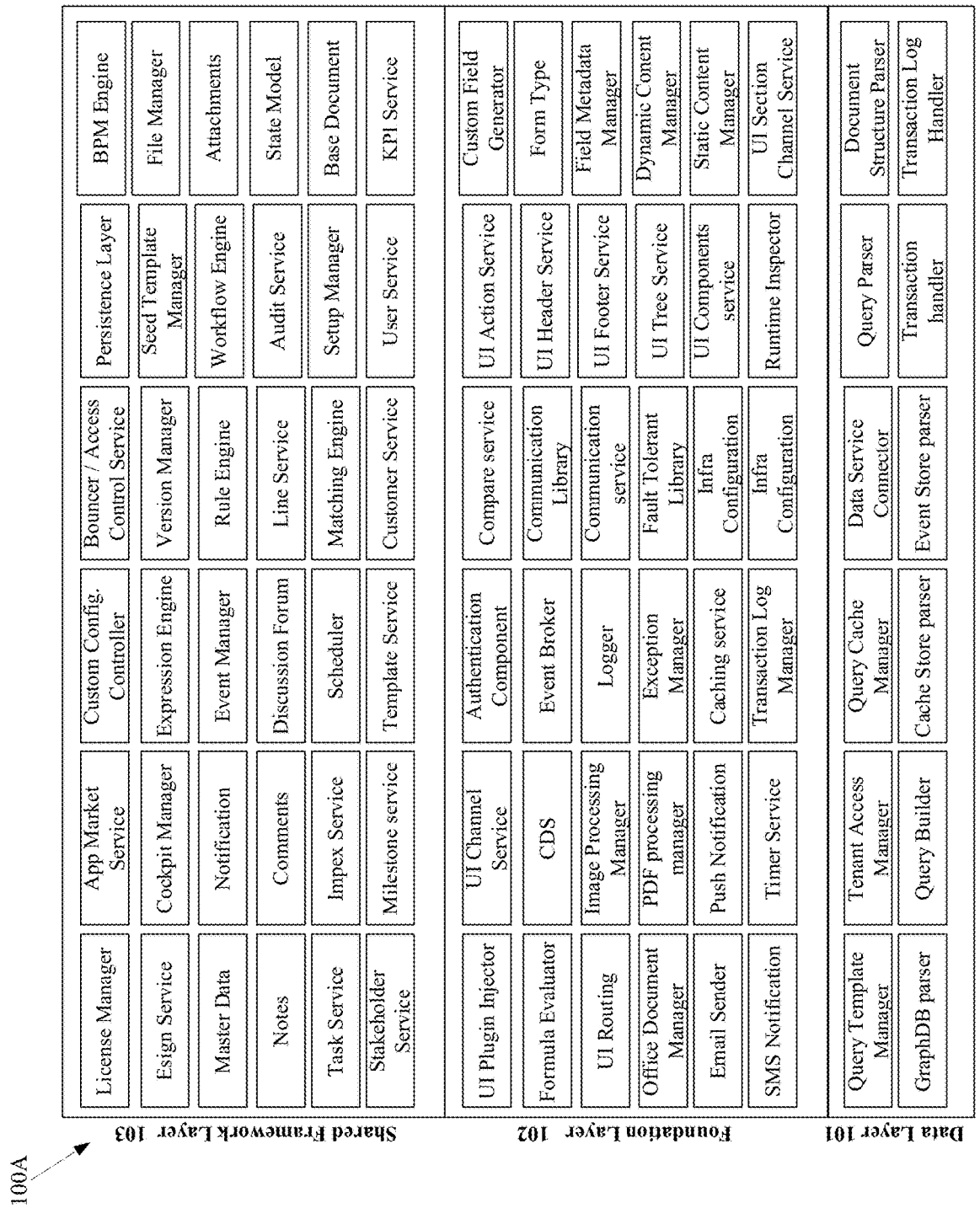

Referring to FIGS. 1 and 1A, a platform architecture 100 for codeless development of one or more enterprise application including a supply chain management (SCM) application is provided in accordance with an embodiment of the present invention. The architecture is a layered architecture 100 configured to process complex operations of one or more SCM applications using configurable components of each layer of the architecture 100. The layered architecture enables faster processing of complex operations as the workflow may be reorganized dynamically using the configurable components. The layered architecture 100 includes a data layer 101, a foundation layer 102, a shared framework layer 103, an application layer 104 and a customization layer 105. Each layer of the architecture 101 includes a plurality of configurable components interacting with each other to execute at least one operation of the SCM enterprise application. It shall be apparent to a person skilled in the art that while FIGS. 1 and 1A provide essential configurable components, the nature of the components itself enables redesigning of the platform architecture through addition, deletion, modification of the configurable components and their positioning in the layered architecture. Such addition, modification of configurable components depending on the nature of the architecture layer function shall be within the scope of this invention.

In an exemplary embodiment, the configurable components enable an application developer user/citizen developer, a platform developer user and a SCM application user working with the SCM application to execute the operations to code the elements of the SCM through configurable components. The SCM application user or end user triggers and interacts with the customization layer 105 for execution of the operation through application user machine 106, a function developer user or citizen developer user triggers and interacts with the application layer 104 to develop the SCM application for execution of the operation through citizen developer machine 106A, and a platform developer user through its computing device 106B triggers the shared framework layer 103, the foundation layer 102 and the data layer 101 to structure the platform for enabling codeless development of SCM applications.

In an embodiment the present invention provides one or more SCM enterprise application with an end user application UI and a citizen developer user application UI for structuring the interface to carry out the required operations.

The layered platform architecture enables a developer user to write code in a true layered manner, so developing each layer becomes a delightful and an easier proposition for developers and system builders/architects. The layered platform further reduces complexity as the layers are build one upon another thereby providing high levels of abstraction, making it extremely easy to build complex features for the SCM application.

In one embodiment, the architecture 100 provides the cloud agnostic data layer 101 as a bottom layer of the architecture. This layer provides a set of micro-services that collectively enable discovery, lookup and matching of storage capabilities to needs for execution of operational requirement. The layer enables routing of requests to the appropriate storage adaptation, translation of any requests to a format understandable to the underlying storage engine (relational, key-value, document, graph, etc.). Further, the layer manages connection pooling and communication with the underlying storage provider and automatically scales and de-scaling the underlying storage infrastructure to support operational growth demands.

The data layer is configured to expose different data abstractions that can be consumed independently or in combinations. The data abstractions serve the purpose of providing independence over type of cloud solutions, paving way for new storage adaptations to be built in the future that can fully replace prior storage adaptation solutions without requiring a single line of code (through configuration).

In an exemplary embodiment, the data layer of the platform architecture includes a plurality of data abstraction configured to be developed as part of a combinatorial data abstraction thereby simplifying solution development at a higher layer. The configurable components of the data layer enable execution of operations related to data layer.

In one example embodiment, Key-Value stores data abstraction of the data layer provides extremely fast lookup and update of values based on a certain key. The underlying hash implementation provides for extremely fast lookups and updates. Because the keys can be partitioned easily, the systems grow horizontally instead of vertically, making resolution of the scaling problem a lot easier. The data abstraction of the present invention provides for Cloud agnostic solutions.

In another example embodiment, a columnar data stores data abstraction of the data layer leverages the fact that while a single document has several attributes, not all attributes are created equally. Usually, a certain attribute or a group of attributes is accessed/used more frequently than others. The data is stored and managed leveraging this characteristic, making it easy to scale systems horizontally and natural to add columns later. Data locality is significantly improved making systems blazingly fast because frequently accessed data is only stored, wasting no space.

In yet another example embodiment, a Graph data stores data abstraction of the data layer excel in maintaining relationships across documents and navigating across documents through relationships in a blazingly fast manner. Nodes in the graph (think documents or references to documents) can be partitioned easily, making it conducive to building horizontally scalable systems.

In an example embodiment, a document data stores data abstraction of the data layer store all attributes of a document as a single record, much like a relational database system. The data is usually denormalized in these document stores, making data joins common in traditional relational systems unnecessary. Data joins (or even complex queries) can be expensive with this data store, as they typically require map/reduce operations which don't lend themselves well in transactional systems (OLTP-online transactional processing).

In another example embodiment, a relational data abstraction of the data layer allows for data to be sliced and analyzed in an extremely flexible manner.

In a related embodiment, the plurality of configurable components includes one or more data layer configurable components including but not limited to Query builder, graph database parser, data service connector, transaction handler, document structure parser, event store parser and tenant access manager. The data layer provides abstracted layers to the SCM service to perform data operations like Query, insert, update, delete and Join on various types of data stores document database (DB) structure, relational structure, key value structure and hierarchical structure.

The memory data store/data lake of the data layer/storage platform layer may be a volatile, a non-volatile memory or memory may also be another form of computer-readable medium, such as a magnetic or optical disk. The memory store may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

In an embodiment the platform architecture provides the foundation layer 102 on top of the data layer 101 of the architecture 100. This layer provides a set of microservices that execute the tasks of managing code deployment, supporting code versioning, deployment (gradual roll out of new code) etc. The layer collectively enables creation and management of smart forms (and templates), framework to define UI screens, controls etc. through use of templates. Seamless theming support is built to enable specific form instances (created at runtime) to have personalized themes, extensive customization of the user experience (UX) for each client entity and or document. The layer enables creation, storage and management of code plug-ins (along with versioning support). The layer includes microservice and libraries that enable traffic management of transactional document data (by client entity, by document, by template, etc.) to the data layer 101, enables logging and deep call-trace instrumentation, support for request throttling, circuit breaker retry support and similar functions. Another set of microservice enables service to service API authentication support, so API calls are always secured. The foundation layer micro services enable provisioning (on boarding new client entity and documents), deployment and scaling of necessary infrastructure to support multi-tenant use of the platform. The set of microservices of foundation layer are the only way any higher layer microservice can talk to the data layer microservices. Further, machine learning techniques auto-scale the platforms to optimize costs and recommend deployment options for entity such as switching to other cloud vendors etc.

In an exemplary embodiment, if in any operational instance the foundation layer does not add any meaningful value on top of the data layer, the platform architecture is configured to build an extremely thin wrapper microservice that does a passthrough of the calls thereby enabling the platform to extend this in the future as the needs evolve.

In an exemplary embodiment, the data layer 101 and foundation layer 102 of the architecture 100 function independent of the knowledge of the operation. Since, the platform architecture builds certain configurable component as independent of the operation in the application, they are easily modifiable and restructured.

In a related embodiment, the plurality of configurable components includes one or more foundation layer configurable components including but not limited to logger, Exception Manager, Configurator Caching, Communication Layer, Event Broker, Infra configuration, Email Sender, SMS Notification, Push notification, Authentication component, Office document Manager, Image Processing Manager, PDF Processing Manager, UI Routing, UI Channel Service, UI Plugin injector, Timer Service, Event handler, and Compare service for managing infrastructure and libraries to connect with cloud computing service.

In an embodiment, the logger configurable component capture logs using Log 4Net based on configuration like ALL, DEBUG, INFO, WARN, ERROR, FATAL, OFF. Storage for logs is be based on cloud agnostic configuration. The exception manager component standardizes exceptions handling in the application. Based on standard error codes, error messages are managed in the consumer layer. API Error handling is managed by a library. The infra configuration component fetches infrastructure specific configurations end points. E.g. database, service end points. The Service is supported by library to cache configurations based on application and entity. The Library is responsible to connect with configuration service and cache the data local to compute service. It enables publication messages paradigm in case any values are updated. The event handler component includes Library responsible to define structure for document API. Mandatory methods are implemented by the team e.g. PreEvent, PostEvent, Event. It acts as a window to process engine. It invokes process or operations management endpoint and passes the payload object. The library is responsible to invoke event Kafka service. Apart from document payload, additional header information is added to ensure data is posted to correct topic and process classification. The component manages retry, compression and backup of messages. After multiple attempts, in case message cannot be posted to Kafka, messages are sent to BrokerService. The broker Service component is responsible to log messages. It is invoked by Lib.EventBroker. Incase failure to send message to Kafka broker, Logged Message will be posted by BrokerService to Kafka. It acts as Auto Retry. The component enables call backs and even tracking status is available through this component. The configurable component Push notification provides ability of a device/browser to receive information pushed from a server. Integrated with device provider like APNS or Gatway. This includes @appln/firebaseevent, @appln/push-notification, @plugin/PushNotification-UI, and @Microservice/Push-notification-service.

In an embodiment, the platform architecture provides the shared framework layer 103 on top of the foundation layer 102. This layer provides a set of microservices that collectively enable authentication (identity verification) and authorization (permissioning) services. The layer supports cross-document and common functions such as rule engine, workflow management, document approval (built likely on top of the workflow management service), queue management, notification management, one-to-many and many-to-one cross-document creation/management, etc. The layer enables creation and management of schemas (aka documents), and support orchestration services to provide distributed transaction management (across documents). The service orchestration understands different document types, hierarchy and chaining of the documents etc.

The shared framework layer 103 has the notion of our operational or application domains, the set of microservices that contribute this layer hosts all the common functionality so individual documents (implemented at the application layer 104) do not have to repeatedly to the same work. In addition to avoiding the reinventing the wheel separately by each developer team, this layer of microservices standardizes the capabilities so there is no loss of features at the document level, be it adding an attribute (that applies to a set of documents), supporting complex approval workflows, etc. The rule engine along with tools to manage rules is part of this layer.

In an exemplary embodiment, the shared framework layer 103 supports the notion of entity/client and documents. The layer captures a set of metadata about the entity/client (where data should be stored, the disaster recovery plans/options, data security standards—encryption, etc., geographical data restrictions by document type) to auto-setup the entity specific infrastructure in an ongoing manner. The set of metadata about the documents (what type of document, what capabilities are needed—approvals, notifications, etc., what interactions are needed with other documents) are also captured by the layer. Generic capability support provided by this layer of microservices is automatically enabled based on this metadata. Further, to ensure all future documents auto-inherit all current and future generic capabilities this layer supports, all documents and microservices from the next applications layer will only go through this layer. When this layer does not provide any value-add, the calls will go through a simple pass through layer of microservices.

In a related embodiment, the plurality of configurable components includes one or more shared framework configurable components including but not limited to license manager, Esign service, application market place service, Item Master Data Component, organization and accounting structure data component, master data, Import and Export component, Tree Component, Rule Engine, Workflow Engine, Expression Engine, Notification, Scheduler, Event Manager, and version service.

In a related embodiment, the configurable component scheduler manages jobs and scheduler expressions for any applications to trigger API. It is used to schedule reminder notifications, backend jobs etc. The Esignature configurable component provides standard API interface for users to leverage eSign functionality. Based on user configuration parameter, either DocSign or Adobe Echo Sign endpoints are invoked. It is single point to touch with eSign services.

In one embodiment, the architecture 100 provides the application layer 104 on top of the shared framework layer 103 of the architecture. The developer user of the platform will interact with the application layer 103 for structuring the SCM application. This is also the first layer, that defines SCM specific documents such as requisitions, contracts, orders, invoices etc. This layer provides a set of microservices to support creation of documents (requisition, order, invoice, etc.), support the interaction of the documents with other documents (ex: invoice matching, budget amortization, etc.) and provide differentiated operational/functional value for the documents in comparison to a competition by using artificial intelligence and machine learning. This layer also enables execution of complex operational/functional use cases involving the documents.

In an exemplary embodiment, a developer user or admin user will structure one or more SCM application and associated functionality by the application layer of microservices, either by leveraging the shared frameworks platform layer or through code to enable the notion of specific documents or through building complex functionality by intermingling shared frameworks platform capabilities with custom code. Besides passing on the entity metadata to the shared frameworks layer, this set of microservices do not carry any concern about where or how data is stored. Data modeling is done through template definitions and API calls to the shared frameworks platform layer. This enables this layer to primarily and solely focus on adding operational/functional value without worrying about infrastructure.

Further, in an advantageous aspect, all functionality or application services built at the application layer are exposed through an object model, so higher levels of orchestrations of all these functionalities is possible to build by custom implementations for end users. The platform will stay pristine and clean and be generic, while at the same time, enables truly custom features to be built in a lightweight and agile manner.

In a related embodiment, the plurality of configurable components includes one or more application layer configurable components including but not limited to domain Gateway Service, Stakeholder Component, application header service, application Line items component, Milestones component, key performance indicator (KPI) component, section component, section component, and metadata component for developing and managing at least one application service.

In an embodiment, the architecture 100 provides the customization layer 105 as the topmost layer of the architecture above the application layer 104. This layer provides microservices enabling end users to write codes to customize the operational flows as well as the end user application UI to execute the operations of SCM. The end user can orchestrate the objects exposed by the application layer 104 to build custom functionality, to enable nuanced and complex workflows that are specific to the end user operational requirement or a third-party implementation user.

In a related embodiment, the plurality of configurable components includes one or more customization layer configurable components including but not limited to a plurality of rule engine components, configurable logic component, component for structuring SCM application UI, Layout Manager, Form Generator, Expression Builder Component, Field & Metadata Manager, store-manager, Internationalization Component, Theme Selector Component, Notification Component, Workflow Configurator, Custom Field Component & Manager, Dashboard Manager, Code Generator and Extender, Notification, Scheduler, form Template manager, State and Action configurator for structuring the one or more SCM application to execute at least one SCM application operation.

In an exemplary embodiment, each of these layers of the platform architecture communicates or interacts only to the layer directly below and never bypasses the layers through operational workflow thereby enabling highly productive execution with secured interaction through the architecture.

Figure 1B:
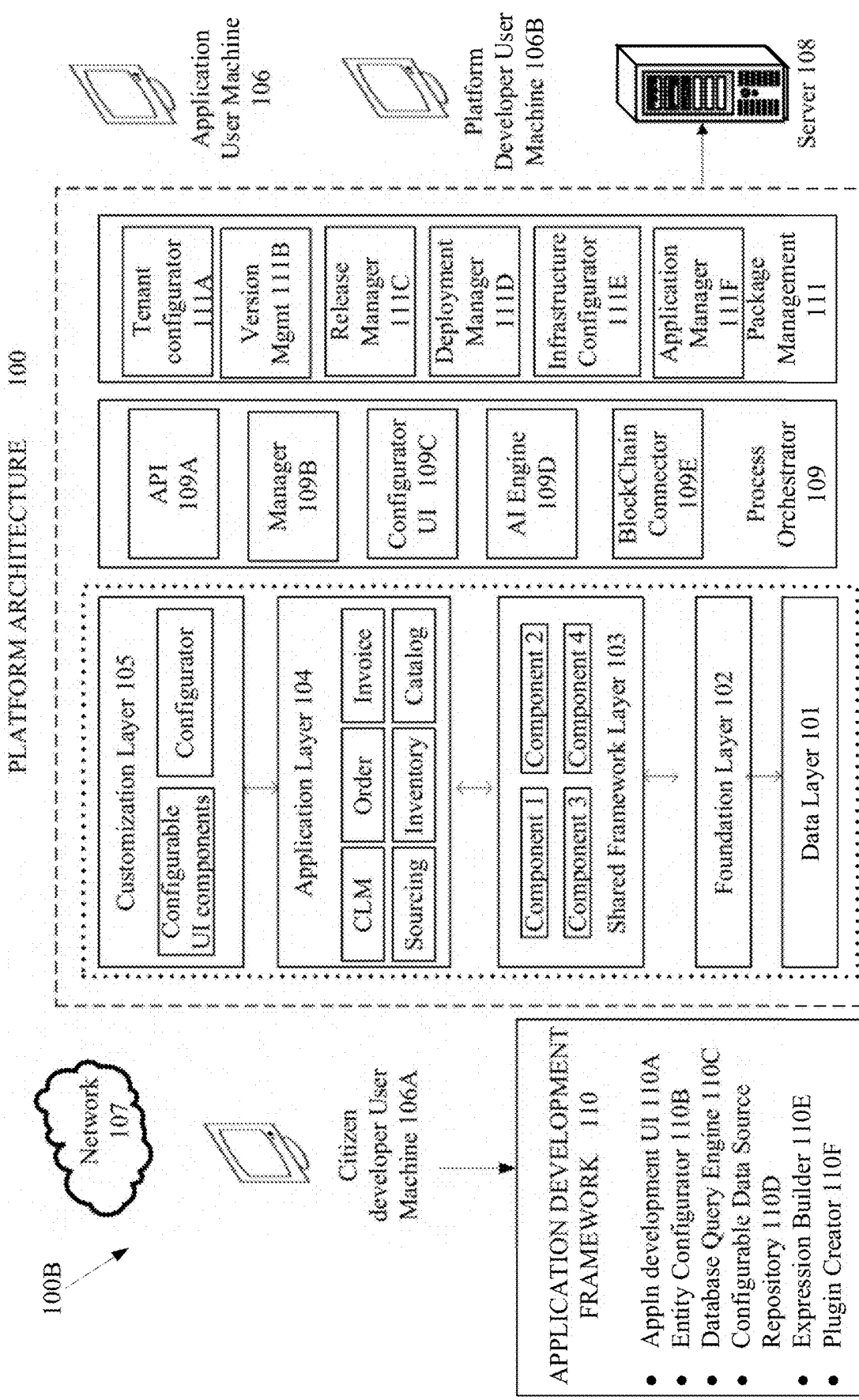
FIG. 1B is a system diagram for codeless development of one of more SCM enterprise application in accordance with an example embodiment of the invention.

Referring to FIG. 1B, a system diagram 100B for codeless development of one of more SCM enterprise application is shown in accordance with an embodiment of the invention. Depending on the type of user the user interface (UI) of the entity machines (106, 106A, 106B) is structured by the platform architecture. The entity machine 106A with a citizen developer user UI is configured for sending, receiving, modifying or triggering processes and data object for creation of one or more of a SCM application over a network 107.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

The system includes a server 108 configured to receive data and instructions from the entity machines (106, 106A, 106B). The system 100 includes a support mechanism for performing various prediction through AI engine and mitigation processes with multiple functions including historical dataset extraction, classification of historical datasets, artificial intelligence based processing of new datasets and structuring of data attributes for analysis of data, creation of one or more data models configured to process different parameters.

In an embodiment, the system is provided in a cloud or cloud-based computing environment. The codeless development system enables more secured processes.

In an embodiment the server 108 of the invention may include various sub-servers for communicating and processing data across the network. The sub-servers include but are not limited to content management server, application server, directory server, database server, mobile information server and real-time communication server.

In example embodiment the server 108 shall include electronic circuitry for enabling execution of various steps by processor. The electronic circuitry has various elements including but not limited to a plurality of arithmetic logic units (ALU) and floating-point Units (FPU's). The ALU enables processing of binary integers to assist in formation of at least one table of data attributes where the data models implemented for dataset characteristic prediction are applied to the data table for obtaining prediction data and recommending action for codeless development of SCM applications. In an example embodiment the server electronic circuitry includes at least one Athematic logic unit (ALU), floating point units (FPU), other processors, memory, storage devices, high-speed interfaces connected through buses for connecting to memory and high-speed expansion ports, and a low speed interface connecting to low speed bus and storage device. Each of the components of the electronic circuitry, are interconnected using various busses, and may be mounted on a common motherboard or in other manners as appropriate. The processor can process instructions for execution within the server 108, including instructions stored in the memory or on the storage devices to display graphical information for a graphical user interface (GUI) on an external input/output device, such as display coupled to high speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

The processor may be implemented as a chipset of chips that include separate and multiple analog and digital processors. The processor may provide coordination of the other components, such as controlling user interfaces, applications run by devices, and wireless communication by devices. The Processor may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user/demand planner and convert them for submission to the processor. In addition, an external interface may be provided in communication with processor, so as to enable near area communication of device with other devices. External interface may provide, for example, for wired communication in some implementations, or for wireless communication in other implementations, and multiple interfaces may also be used.

In an example embodiment, the system of the present invention includes a front-end web server communicatively coupled to at least one database server, where the front-end web server is configured to process the dataset characteristic data based on one or more prediction data models and applying an AI based dynamic processing logic to automate codeless development actions through process orchestrator.

In an embodiment, the platform architecture 100 of the invention includes a process orchestrator 109 configured for enabling interaction of the plurality of configurable components in the layered architecture 100 for executing at least one SCM application operation and development of the one or more SCM application. The process orchestrator 109 includes an application programming interface (API) 109A for providing access to configuration and workflow operations of SCM application operations, an Orchestrator manager 109B configured for Orchestration and control of SCM application operations, an orchestrator UI/cockpit 109C for monitoring and providing visibility across transactions in SCM operations and an AI based process orchestration engine 109D configured for interacting with a plurality of configurable components in the platform architecture for executing SCM operations.

In an embodiment, the process orchestrator includes a blockchain connector 109E for integrating blockchain services with the one or more SCM application and interaction with one or more configurable components. Further, Configurator User interface (UI) services are used to include third party networks managed by domain providers.

Figure 1C:
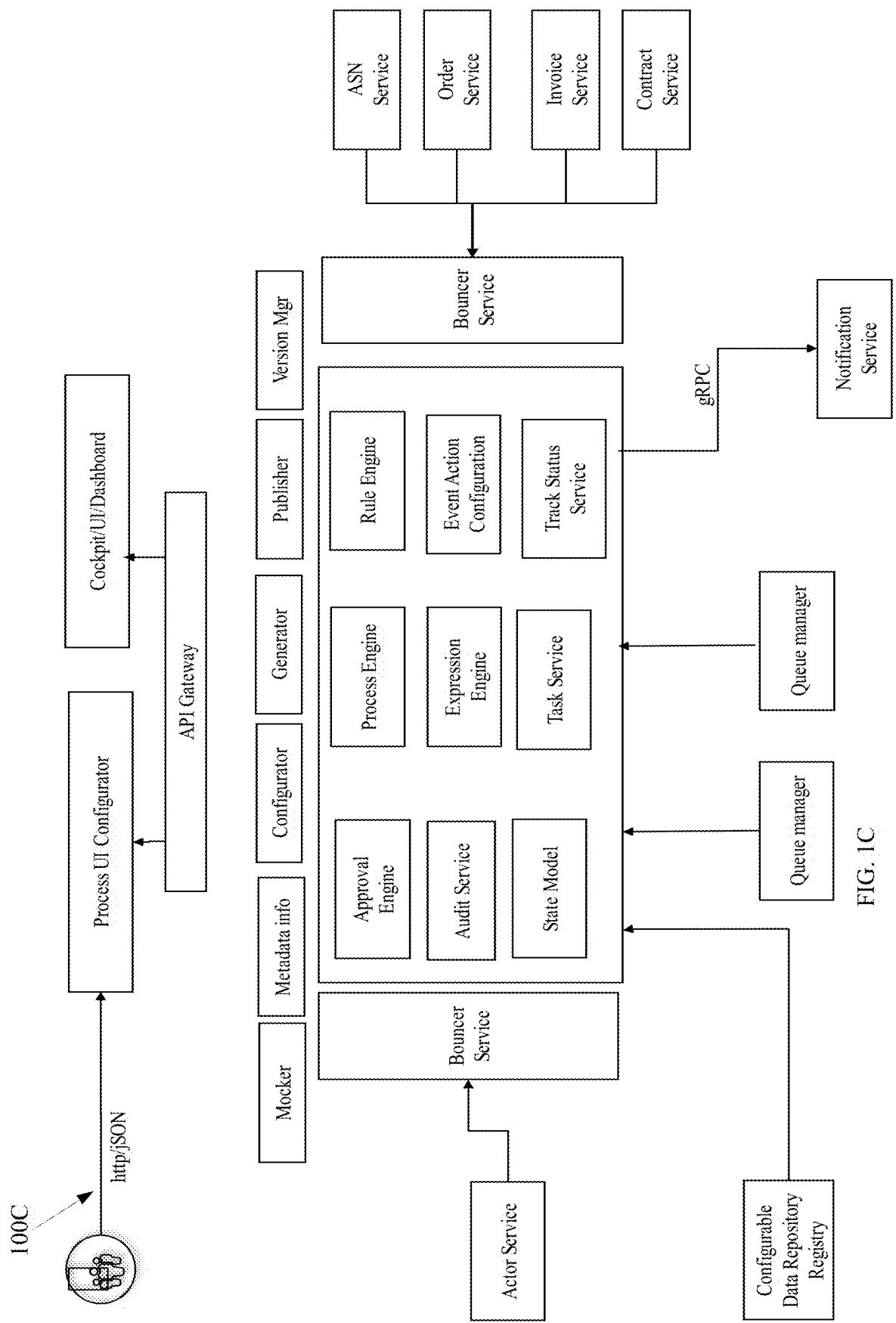
FIG. 1C is a process orchestrator schematic diagram in accordance with an embodiment of the invention.

In a related aspect, the orchestrator UI provides details through graphical representation to customize data flow, workflow, manage run, settings and configuration to execute the workflow. The AI based orchestrator engine coupled to a processor execute SCM operation by at least one data model wherein the AI engine transfers processed data to the UI for visibility, exposes SCM operations through API and assist the manager for orchestration and control. FIG. 1C, shows a process orchestrator schematic block diagram 100C.

In an embodiment, the present invention uses GPUs (Graphical processing units) for enabling AI engine to provide computing power to processes humongous amount of data.

In an exemplary embodiment, the AI engine employs machine learning techniques that learn patterns and generate insights from the data for enabling the process orchestrator to automate operations. Further, the AI engine with ML employs deep learning that utilizes artificial neural networks to mimic biological neural network in human brains. The artificial neural networks analyze data to determine associations and provide meaning to unidentified or new dataset.

In another embodiment, the invention enables integration of Application Programming Interfaces (APIs) for plugging aspects of AI into the dataset characteristic prediction and operations execution for development of the SCM enterprise application.

Figure 1D:
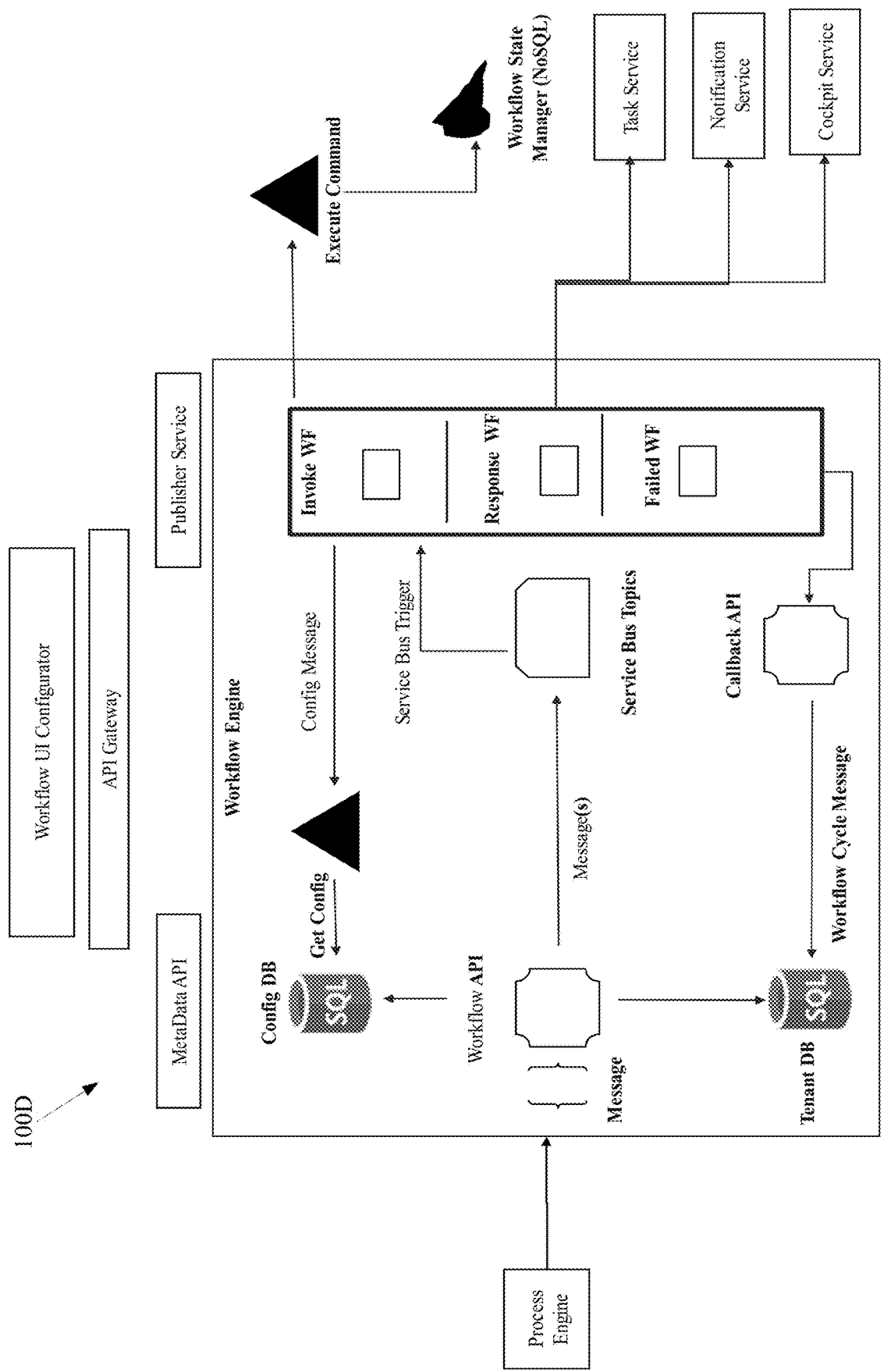
FIG. 1D is a workflow engine schematic diagram in accordance with an embodiment of the invention.

Referring to FIG. 1D, a workflow engine schematic block diagram 100D in accordance with an embodiment of the invention. The workflow engine enables monitoring of workflow across the SCM applications. The workflow engine with the Process orchestrator enables the platform architecture to create multiple approval workflows.

In an embodiment the entity machines (106, 106A, 106B) may communicate with the server 108 wirelessly through communication interface, which may include digital signal processing circuitry (FIG. 1B). Also, the entity machines (106, 106A, 106B) may be implemented in a number of different forms, for example, as a smartphone, computer, personal digital assistant, or other similar devices.

In an exemplary embodiment, the developer application user interface (UI) and the application user interface of the entity machines (106, 106A) enables cognitive computing to improve interaction between user and an enterprise or supply chain application(s). The interface improves the ability of a user to use the computer machine itself. Since, the interface triggers configurable components of the platform architecture for structuring an SCM application to execute at least one operation including but not limited to creation of Purchase order, Contract lifecycle management operations, Warehouse management operations, inventory management operations etc., at the same instant, the interface thereby enables a user to take informed decision or undertake an appropriate strategy for adjusting workflow for execution of operations. By structuring operations and application functions through a layered platform architecture and eliminating multiple cross function layers, repetitive processing tasks and recordation of information to get a desired data or operational functionality, which would be slow and complex the user interface is more user friendly and improves the functioning of the existing computer systems.

In an embodiment the system 100B of the present invention provides a development application framework 110 for codeless development of SCM applications (FIG. 1B). The framework 110 includes an application user interface (UI) 110A of a development application having a plurality of data objects configured to trigger a plurality of configurable component of a layered platform architecture to structure one or more SCM application. The framework 110 also includes an entity configurator 110B for defining a plurality of configuration parameters to create the SCM application, a database query engine 110C configured to fetch data from a plurality of distinct databases, a configurable data source (CDS) repository 110D for storing a plurality of API configured to be invoked dynamically by a user through the interface for creating the SCM application, an expression builder 110E configured for customizing application processing logic for execution of at least one SCM application operation, and a plugin creator engine 110F configured to implement a plurality of reusable plugin for enriching the layered platform architecture 100. The application user interface 110A includes a UI form builder component to structure one or more SCM application for executing one or more SCM operation by a SCM application end user through a SCM application UI. The plurality of API is configured to interact with the application framework wherein an AI based processing logic integrates deep learning, predictive analysis, information extraction and robotics for triggering a dynamic data object injector to conditionally load the plurality of data objects on the SCM application UI thereby processing the one or more SCM application operation.

In a related embodiment, the platform architecture provides package management 111 (FIG. 1B). Component plays a larger role to manage and deploy package through automation process, using various sub-components such as Tenant Configurator 111A, version management 111B, Release manager 111C, Deployment Manager 111D, Infrastructure configurator 111E and application manager 111F. These components provide window for platform developer, application developer to release the packages and provide visibility of the deployment pipeline. The tenant configurator 111A enables deployment of packages to one or more clients across environments. It provides ability to create and manage details of customers through UI. It gives deployment experience through projects and environments to support the tenant concept. The Version management component 111B manages multiple versions of the packages and changes made by application developers and platform developers. The component provides UI to look at multiple versions of the package and compare versions. It manages minor and major versions. The numbered versions are interpreted as major.minor.patch, with an optional "prerelease tag" afterwards in the form-tag. Versions can be sorted predictably. For example, 1.2.3 is newer than 1.2.0. The release manager component 111C is responsible for managing, planning, scheduling, and controlling delivery throughout the release lifecycle using other subcomponents and for Orchestrating entire pipeline with automation. The deployment manager component 111D configures and run delivery workflows for applications and platforms. It Creates standardized deployment process to deploy predictable, high-quality releases. The component automates workflows, including versioning, application package generation, artifact management, and package promotion to different stages in the workflow. The infrastructure configurator component 111E is responsible to provision services and database repositories as per application and loads. The component supports automation to provision infrastructure as per release and version. The application manager component 111F enables structuring of multiple versions of applications developed by application developer on the screen and allows tenant and customers to select the version.

Figure 1E:
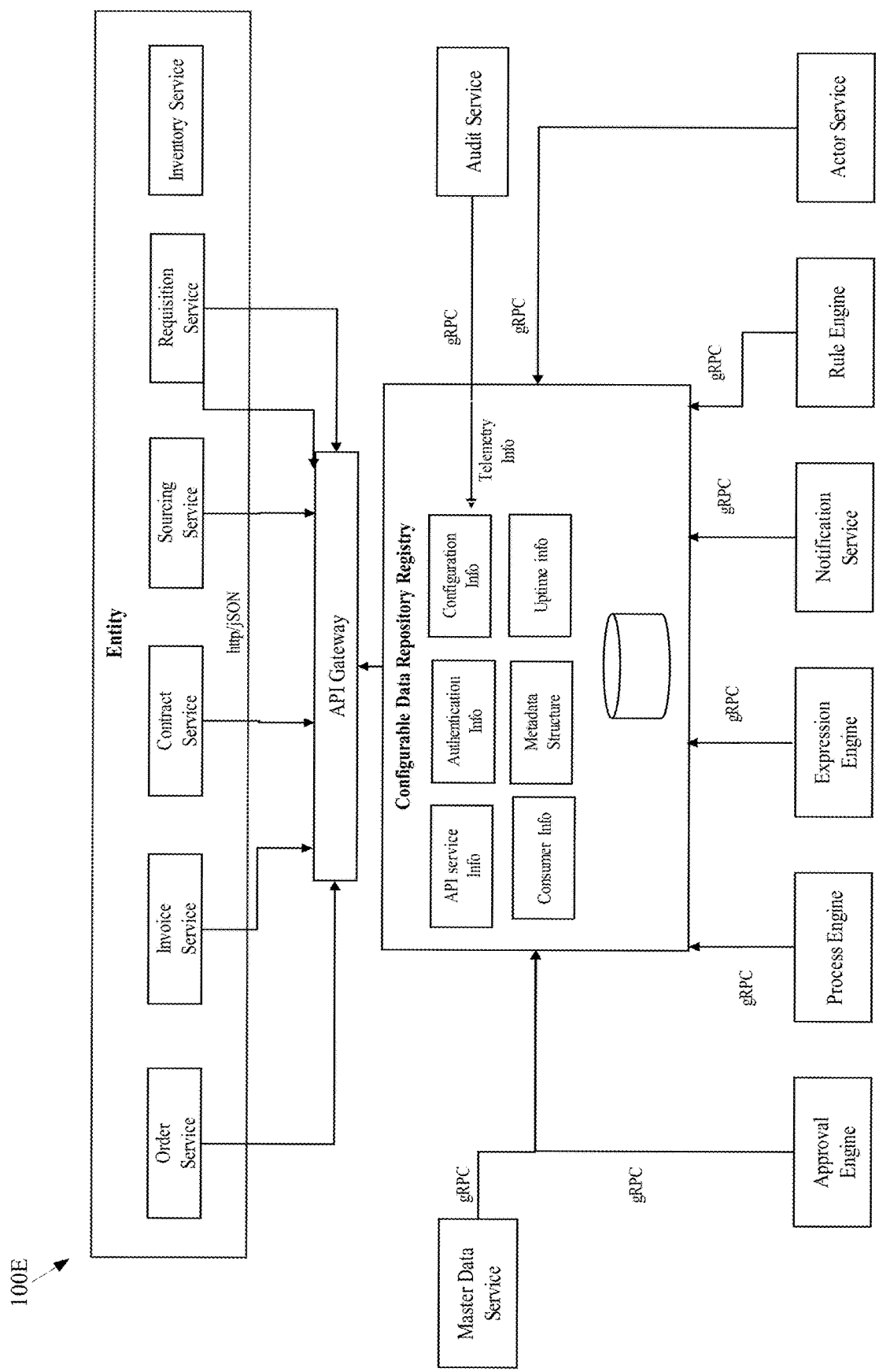
FIG. 1E is a configurable data source (CDS) schematic diagram in accordance with an embodiment of the invention.

Referring to FIG. 1E, a configurable data source (CDS) schematic block diagram 100E is shown in accordance with an embodiment of the invention. Some of the features for CDS includes Enhancing CDS user experience for developers, support multiple API calls, identify dependencies in real time, dynamically configure API using NoSQL database, Header level UX enhancements for CDS, and access control.

In an exemplary embodiment, apart from application user interface, output of the layered platform architecture is exposed as API for third party digital platforms and applications. The API is also consumed by bots and mobile applications.

Figure 1F:
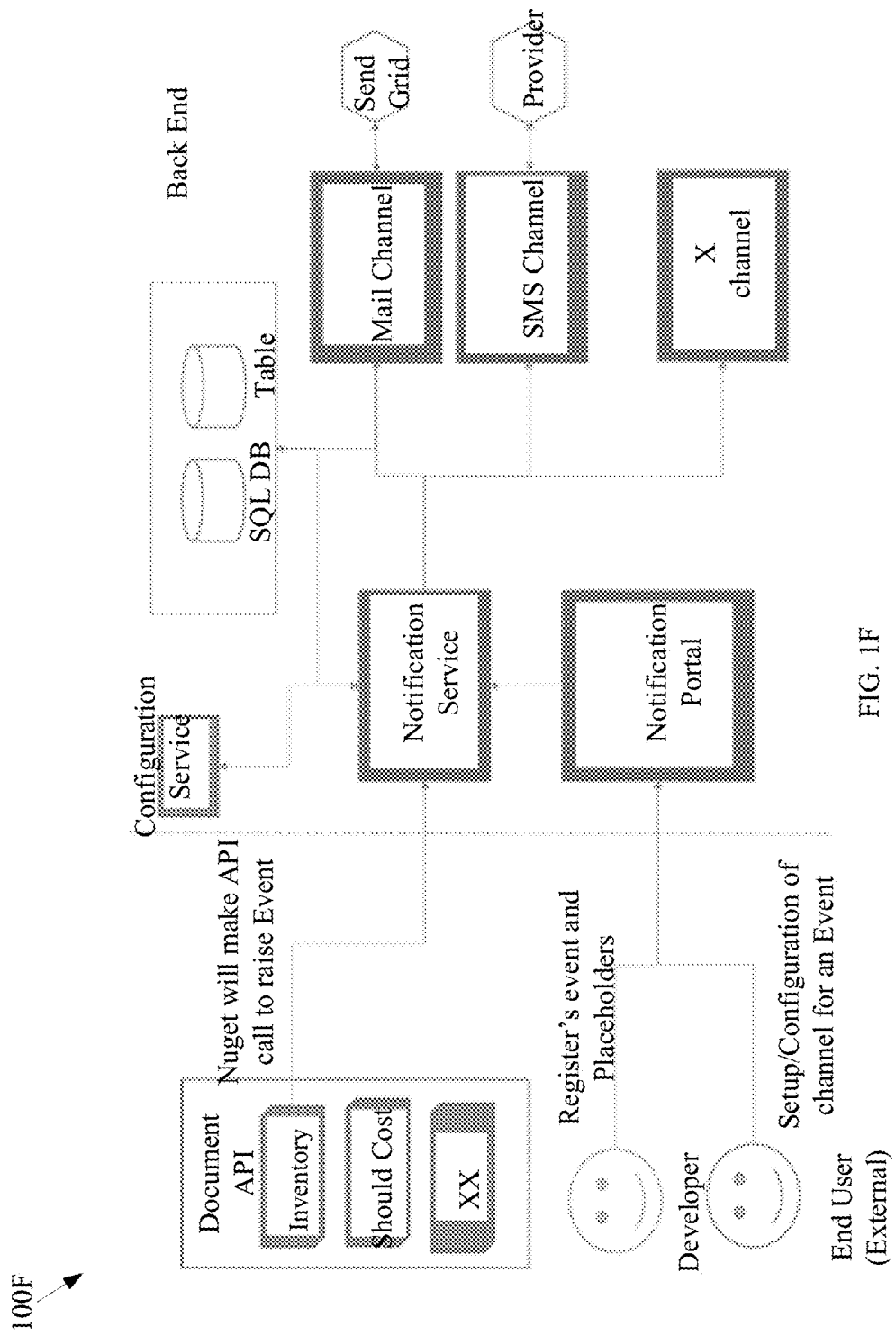
FIG. 1F is a notification process flow diagram in accordance with an embodiment of the invention.

In an embodiment, the codeless platform architecture of the present invention provides notification service. Referring to FIG. 1F, a notification process flow 100F for the codeless development platform architecture is shown. Notification are performed based on Events, documents raises Event and Notification Service understands Events. Notification coordinates execution of notification with Channel Service, Channel are configurable by end User and New Channel can be added as per requirement. There is no code requirement for a document Team.

In a related embodiment, the development application framework is supported by a dynamic database structure. The database structure enables management of custom fields and creation of new application. The features include query builder for application end user and development application user or citizen developer.

Figure 1G:
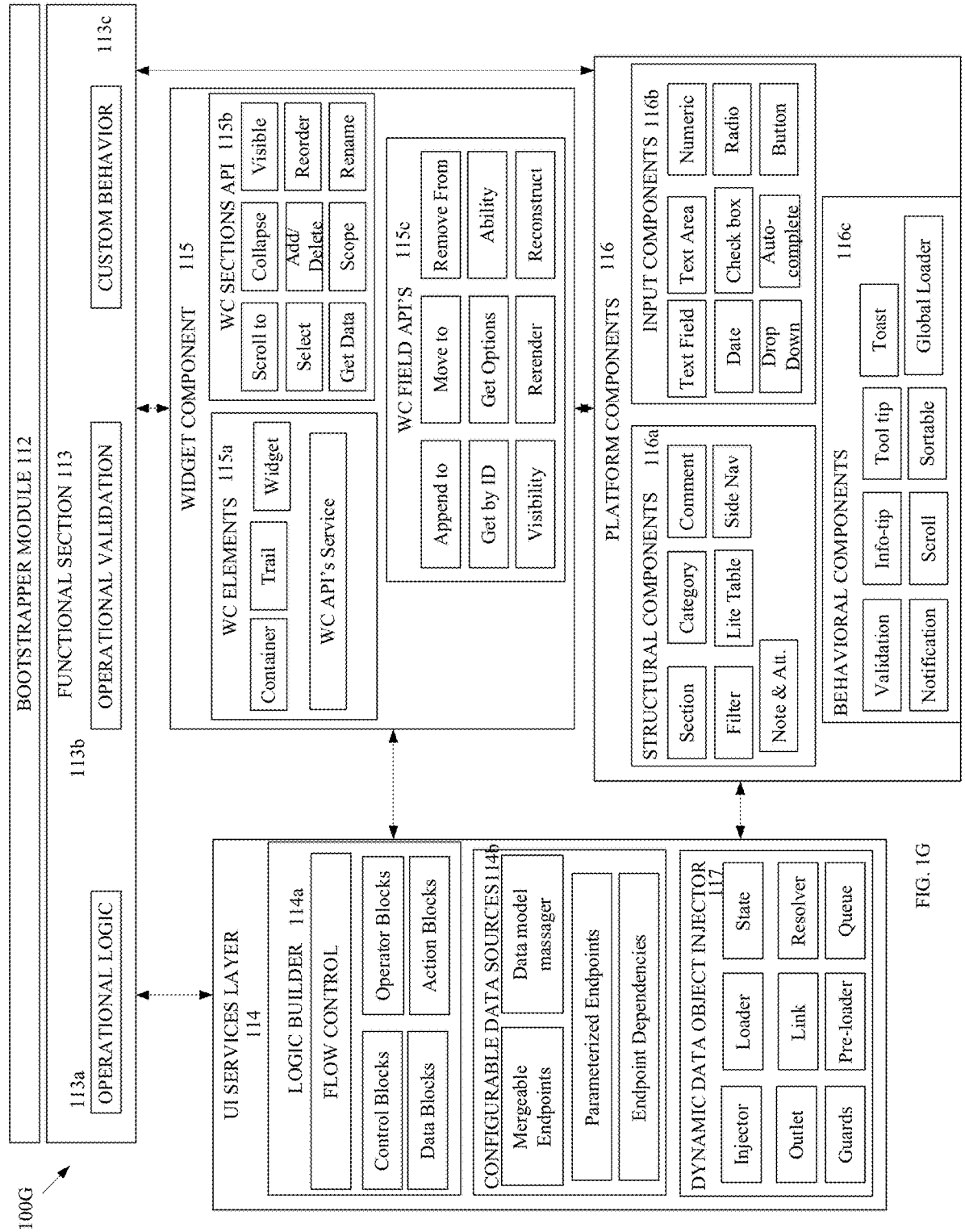
FIG. 1G is a micro-frontend architecture of the platform architecture for codeless development of one or more SCM enterprise application in accordance with an embodiment of the invention.

In one example embodiment, referring to FIG. 1G, a micro-frontend architecture 100A of the platform architecture for codeless development of one or more SCM enterprise application is provided. The architecture 100G includes, bootstrapper module 112 on top of a functional section 113 with operational logic 113a, operational validation 113b and custom behavior 113c. The functional section 113 is communicating with a UI services layer 114, widget component tool 115 and platform components tool 116 where these tools interact with one another as well.

In a related embodiment, the platform components 116 includes structural components 116a, input components 116b and behavioral components 116c. The structural components 116a may include section, filter, category, lite table, comment, side Nav, note and attribute among others. Further, the input components 116b may include text field, date, drop-down, text area, check box, auto-complete, numeric, radio and button among others. Similarly, the behavioral component 116c may include validation, notification, toast, info-tip, scroll, global loader, tool tip and sorter among others.

In another related embodiment, the widget component (WC) tool component 115 includes WC elements 115a, WC sections API's 115b and WC field API's 115c. The WC elements 115a include container, trail, widget interacting with WC API services. WC sections API 115b may include scroll to, select, get data, collapse, Add/delete, scope, visible, reorder and rename components among others. The WC field API 115c may include append to, Get by ID, visibility, move to, get options, re-render, remove from, ability and reconstruct among others.

In an embodiment, the widget component is configured for enabling the user to implement logics through a scope module of the widget. The scope module is related to a user work profile, activity and the task related to restructuring of the application. The processor of the system is coupled with the widget component and configured to generate new forms using a set of default base documents and leverage an existing master data element exposed through the API.

In another related embodiment, the UI layer or platform services component 114 includes logic builder 114a, configurable data source 114b and dynamic data object injector components 117. The logic builder component 114a includes flow control component interacting with control blocks, data blocks, operator blocks and action blocks for building the logic to carry out the operation/task.

In a related embodiment, the configurable data sources 114b include mergeable endpoints, parameterized endpoints, endpoint dependencies and a data model massager. The data source such as inventory, purchase order, invoices, finance modules, contracts, RFx modules, supplier module, item master, supplier master, bill of materials, vendor master, warehouse management module and logistics management module are configurable for restructuring the application.

In an embodiment, the dynamic data object injector component 117 includes injector, outlet, guards, loader, link, pre-loader, state, resolver and queue blocks as part of the micro-frontend architecture.

In an exemplary embodiment, the dynamic data object injector 117 includes at least one data object module configured for conditionally loading on an application UI, an identifier associated with the at least one data object and a data model associated with the identifier and a plurality of metadata stored in the data repository. The at least one data object module interacts with the plurality of configurable components of the layered platform architecture based on the at least one SCM application operation for structuring the one or more SCM application. The identifier is triggered based on at least one protocol generated by the AI engine coupled to the processor and based on an AI based processing logic in response to receiving an operation to be executed. The at least one module relates to functions of the application including procurement, inventory management, supplier management, warehousing, transporting, Purchase order and logistic. Further, the identifier is an element of the injector 117 associated to a code of the protocol and configured for uniquely identifying the module to be triggered by the AI engine. Furthermore, the data model is a conceptual, logical and physical structure relating data objects associated with the identifier and the plurality of meta data.

In an embodiment, the configurable components of the layered architecture from different layers perform different function. The configurable component of internationalization and localization includes the process of designing an application so that it can be adapted to various languages and regions without engineering changes. Localization is the process of adapting internationalized software for a specific region or language by translating text and adding locale-specific components. For eg: @appln/internatilaization, @appln/moment, @microservices/internationalization, and @GCP/Localization. The configurable component UI routing manager enables navigation by interpreting a browser URL as an instruction to change the view. For eg., @appln/workspace, @appln/route-manager, and @GCP/Portal. The plugin injector configurable component as a universal loader is responsible to lazily load external chunks (supported types are listed in constraints) through metadata. For eg; appln/worplugin-injector, @GCP/Portal. The UI store manager component consists of APIs that allow storing data on the end user machines and then retrieve it when required. For eg: @appln/Core. The configurable component UI channel service is responsible to communicate messages internally between plugins. The resolver API component is based on routing params from builder API and it decides the resolution path to one of the database adapters layers with specific syntax. The bouncer API component checks the incoming code (BPC-Buyer partner code) and provides result for the same. It is a gate keeper for the multi-tenant architecture. Manages Access control based on entity mapping with actors/persona. Customizable access control policy based on applications and business domain/customers. The notification component provides support for event based as well as time-based notifications. The component includes the capability of Configurable recipients based on roles and actual users, Configurable subject, Configurable body, Support of Field variables in subject and body, attachments and recurrence. The notes and attachment component of the platform architecture provides support for uploading multiple file types and multiple files together. To support migrations for big clients, this component should provide a support for uploading large files of sizes 500-1000 GB. In addition to this, it should also provide a configurable capability of for virus scans. Additionally, we would need stepper capability in it where the component will allow uploading different files in one go i.e. on the first step it will allow to load an excel file and in the next step it will allow to load the corresponding zip file containing the attachments. The attachment component enables creation of customized plugin for supporting notes and attachments. The file manager component is used for creating customized PDF's based on the user needs. The OCR component extracts the actual contract attributes from supplier paper. The extraction of attributes is supported for free text as well as master fields. For master fields, the component provides confidence % as well.

Figure 2:
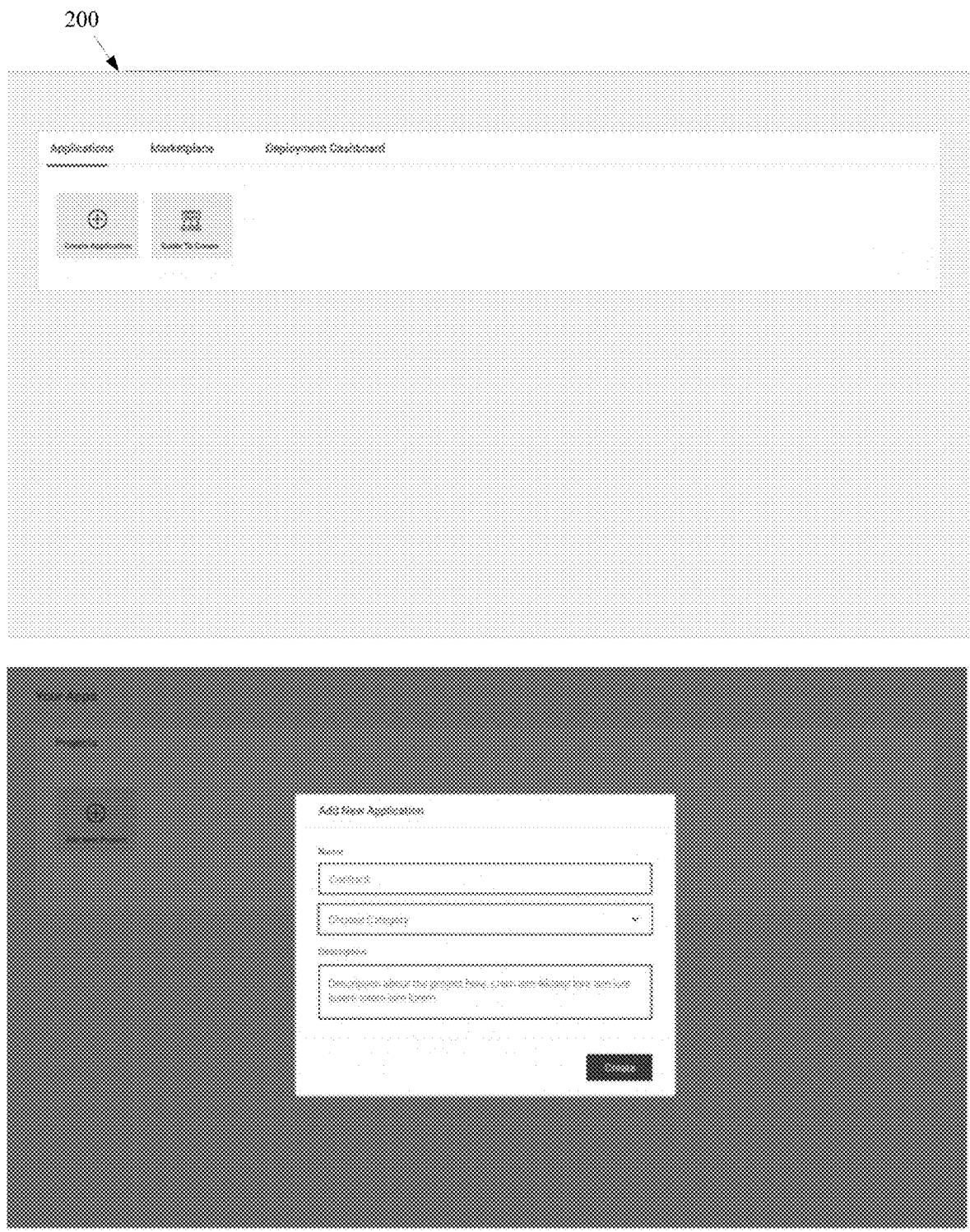
FIG. 2 is a development application user interface showing an application creation screen in accordance with an embodiment of the invention.

Referring to FIG. 2, a development application user interface 200 is shown in accordance with an embodiment of the invention. The development application user interface 200 allows a citizen developer to create SCM application with top down approach or boot up approach. The top-down approach includes creation of new application, configurable data source, user interface, expression builder, localization, theming, migration, rule engine, process orchestrator, operational process management or workflow and publication. The boot up approach includes creation of new application, entity configuration, query builder, configurable data source, user interface, localization, expression builder, plugins, rule engine, process orchestrator, operational process management or workflow and publication.

Figure 2A:
FIG. 2A is a development application user interface showing an entity configurator screen in accordance with an embodiment of the invention.

Referring to FIG. 2A, a development application user interface showing entity configurator screen 200A is shown in accordance with an embodiment of the invention. The configuration parameters for entity configuration include SCM application data, data types, representation and configuration processing logics.

Figure 2B:
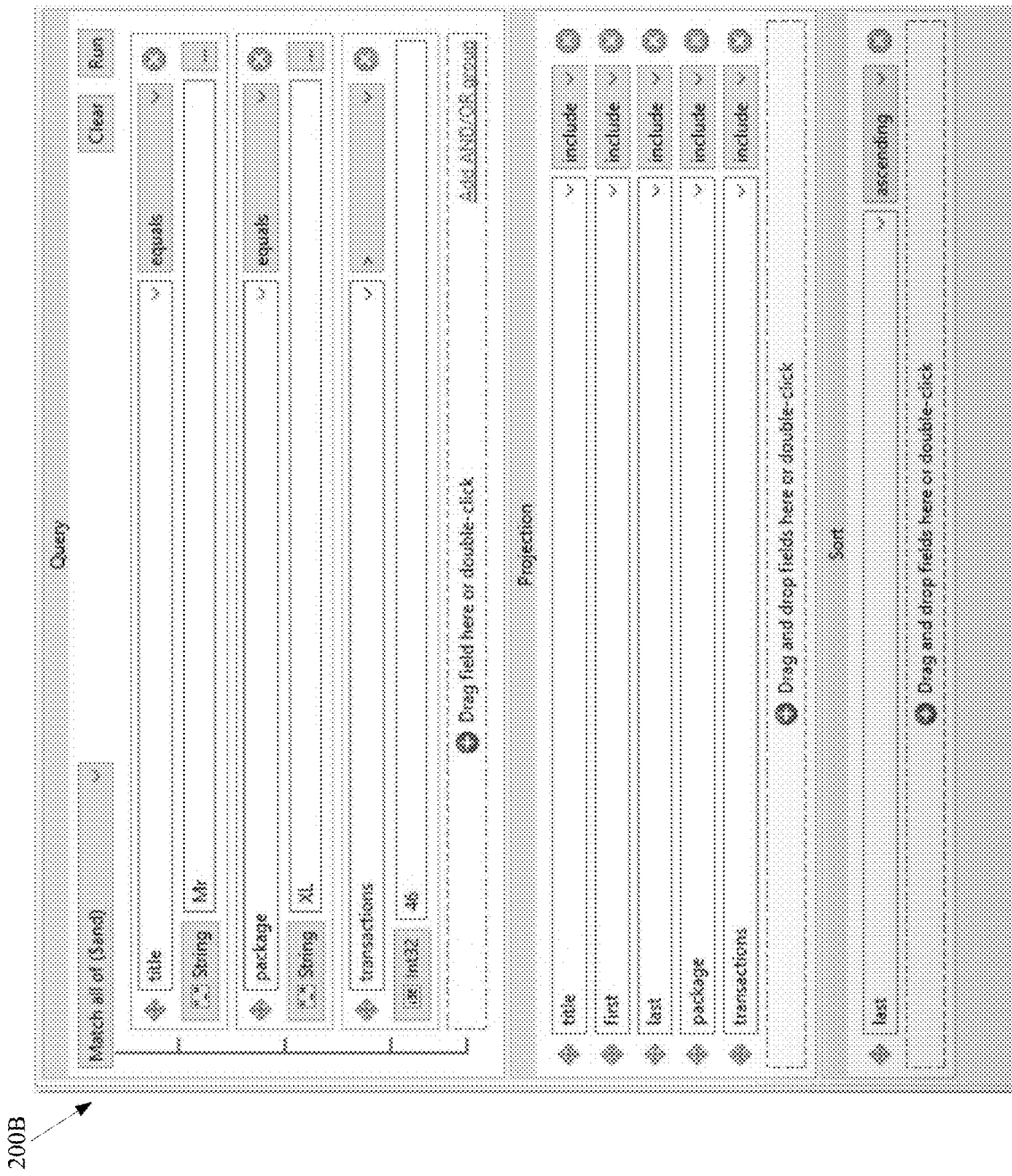
FIG. 2B is a development application user interface showing a database querying screen in accordance with an embodiment of the invention.

Referring to FIG. 2B, a development application user interface showing a database querying screen 200B in accordance with an embodiment of the invention. The interface allows the developer to query plurality of databases for matching, projection and sorting.

Figure 2C:
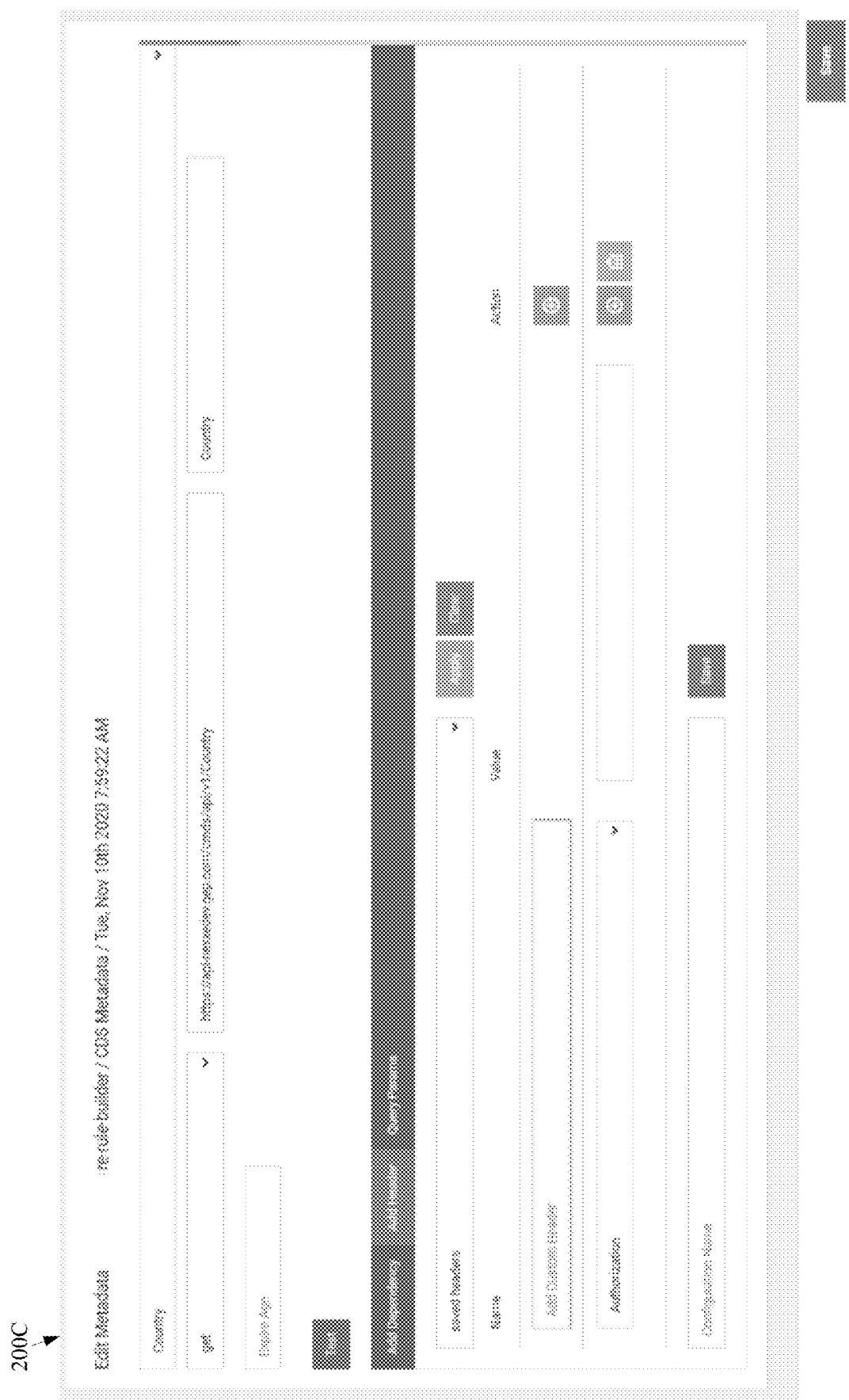
FIG. 2C is a development application user interface showing a configurable data source screen in accordance with an embodiment of the invention.

Referring to FIG. 2C, a development application user interface showing a configurable data source (CDS) screen 200C is provided in accordance with an embodiment of the invention. In this screen, the developer is registering all the APIs that are used within the system. Later, the platform dynamically invokes them based on where the consumption. Configurable data source is single repository for all the APIs in the system including master data APIs and project APIs in addition to any API might be exposed by the client in the future. All APIs can be maintained separately without any impact on the ongoing projects. No deployment required. Backend CDS API will act like a proxy between the projects.

In an embodiment the dynamic object injector of the UI form builder includes at least one data object module configured for conditionally loading on the application UI, an identifier associated with the at least one data object module where the identifier is triggered based on at least one protocol generated by an AI engine coupled to a processor and based on an AI based processing logic in response to receiving the at least one SCM application operation at a server to be executed and a data model associated with the identifier and a plurality of metadata stored in a data repository where the at least one data object module interacts with the plurality of configurable components of the layered platform architecture based on the at least one SCM application operation for structuring the one or more SCM application. The identifier is an element of the injector associated to a code of the protocol and configured for uniquely identifying the module to be triggered by the AI engine.

Figure 2D:
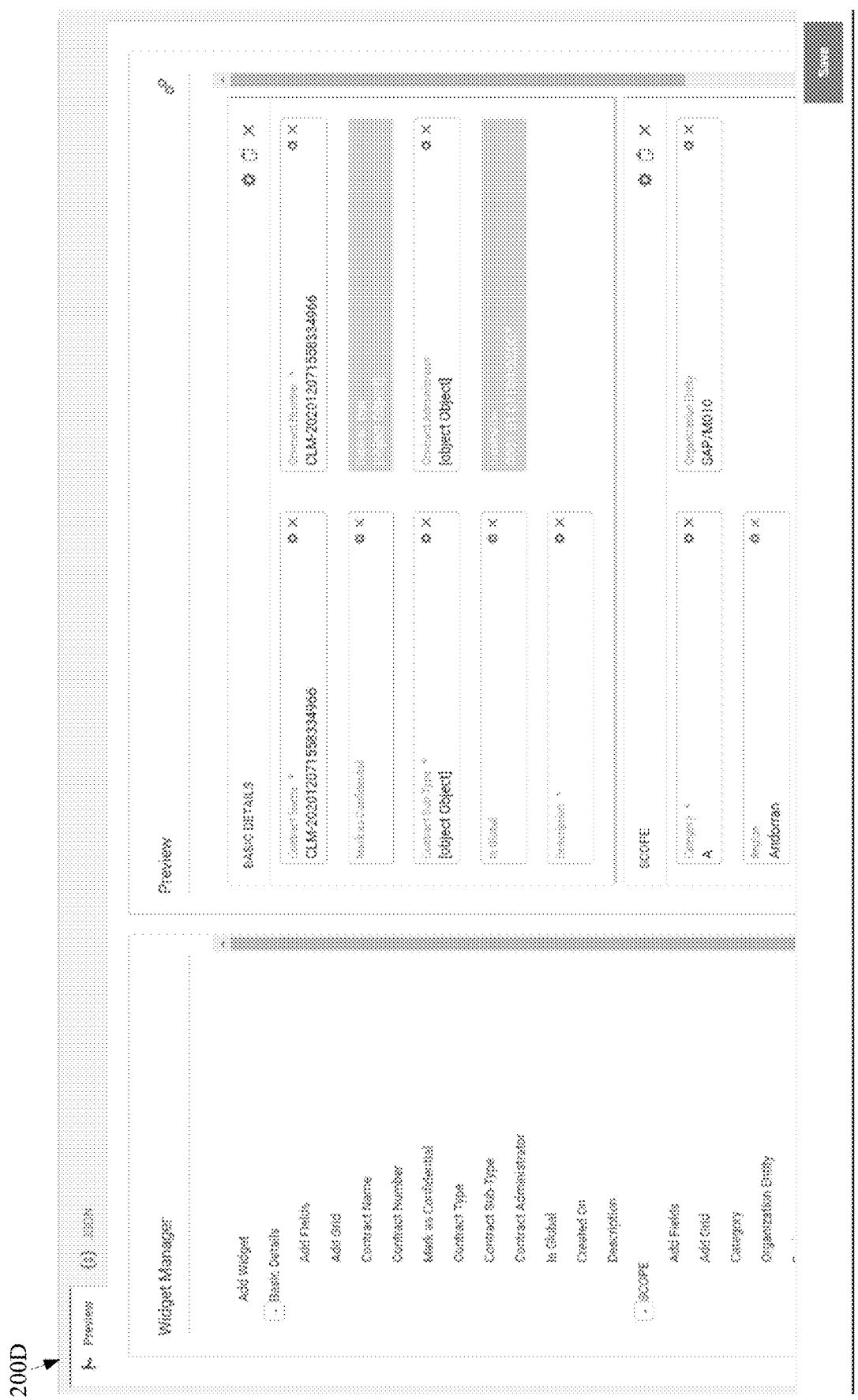
FIG. 2D is a development application user interface showing a widget screen in accordance with an embodiment of the invention.

In an embodiment, the at least one object module is a widget module injected into the application UI/dynamic object module (DOM) with configuration and a scope data of widget wherein the scope data is associated with a user work profile, user activity and the operation. The widget module includes objects to add field, add grid, set data element properties, drag and drop filed, through the widget module. FIG. 2D shows a development application interface for widget screen 200D.

Figure 2E:
FIG. 2E is a development application user interface showing an edit field screen in accordance with an embodiment of the invention.

In an exemplary embodiment, the development application framework of the platform architecture enables codeless development by defining custom fields and standard fields for the application UI where the standard fields are application specific fields required while structuring the one or more SCM application to accomplish nature of the one or more SCM application and the custom fields are operational requirement specific fields. FIG. 2E shows a development application interface with edit field screen 200E.

Figure 2F:
FIG. 2F is a development application user interface showing an expression builder screen in accordance with an embodiment of the invention.

Referring to FIG. 2F, an expression builder interface screen 200F of the application development framework is shown in accordance with an embodiment of the invention. The expression builder customizes application processing logic by setting relation between data elements, setting UI interaction based on end user inputs, hiding-showing and enabling-disabling fields and widgets dynamically, validating data elements and updating/resetting inputs to execute the at least one SCM application operation.

In an embodiment, the application framework supports localization actions on the interface as it provides application specific keys that are translated in any language as per end user requirement. It can be customizable as per client operational terminologies.

Figure 2G:
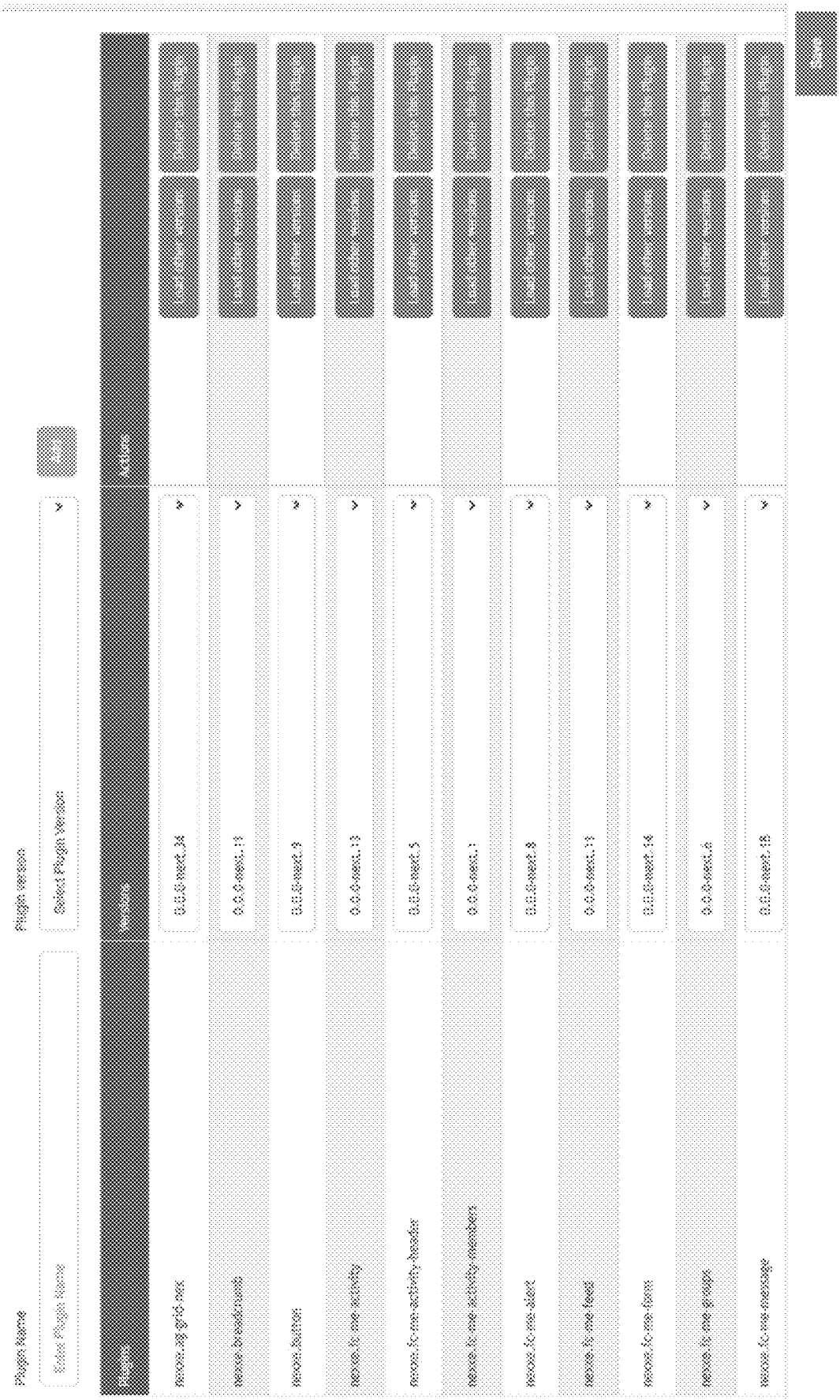
FIG. 2G is a development application framework interface with plugin screen in accordance with an embodiment of the invention.

Referring to FIG. 2G, the application framework interface with plugin screen 200G is shown in accordance with an embodiment of the invention. Even if the platform has a missing feature or component, through the plugins page, the citizen developer can implement any plugin required and upload into the portal and can be consumed as it was part of the platform initially. This feature opens the gate to the citizen developer to implement reusable plugins and enrich the platform.

Figure 2H:
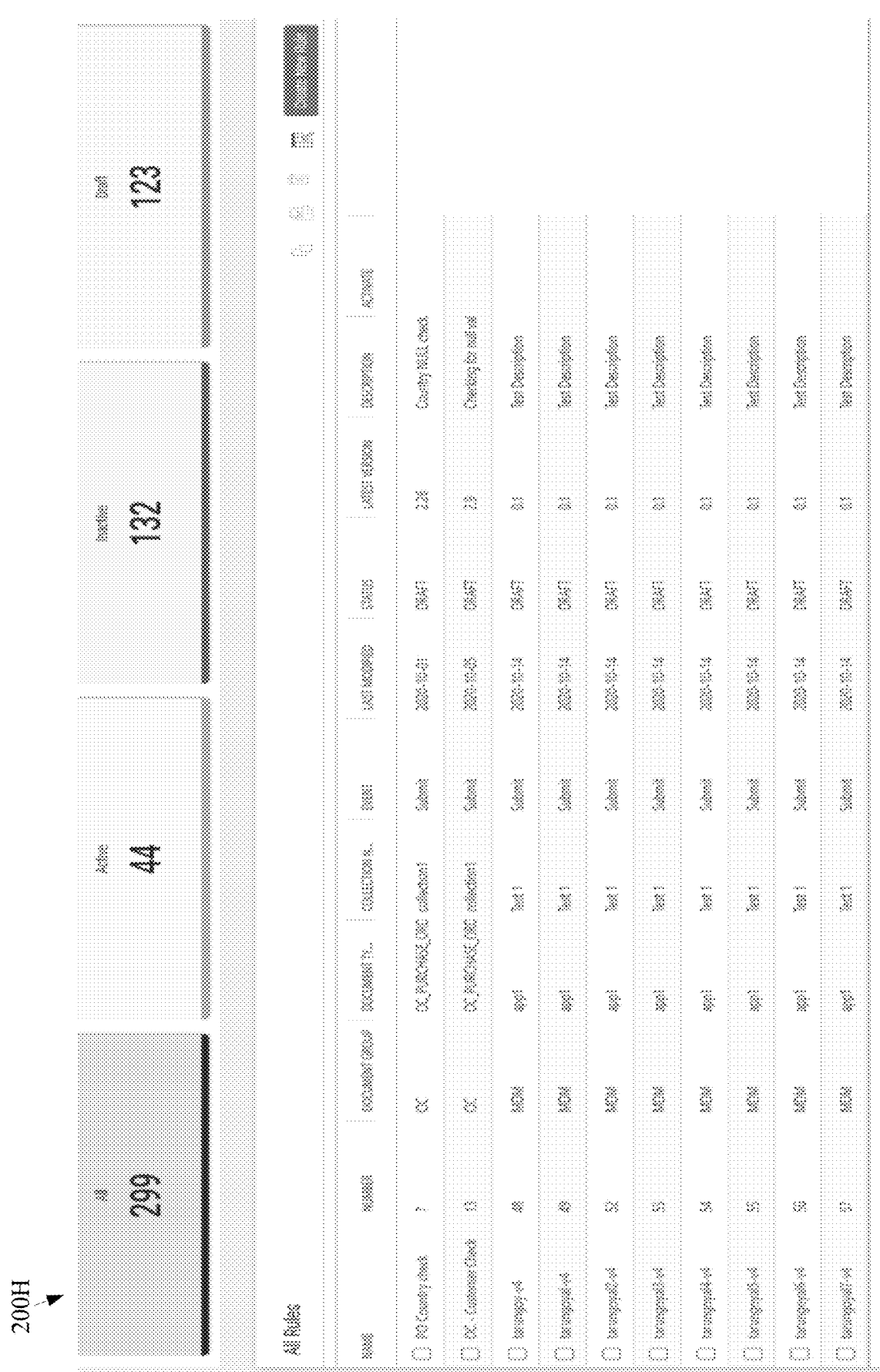
FIG. 2H is a development application framework interface with rule engine creation screen in accordance with an embodiment of the invention.

In an embodiment, one of the plurality of configurable component is a rule engine configured for creating and modifying processing rules to execute the at least one SCM application operation wherein the rule engine enables processing of validation actions, decision making, workflow processes, operational customization, and exceptional routing based on operational requirement. Referring to FIG. 2H, a development application framework UI for rule engine creation screen 200H is shown. Since, operational rules can change more frequently than other parts of the application code. Rules engines or inference engines serve as pluggable component which execute operational rules that a rules approach has externalized or separated from application code. This externalization or separation allows application users to modify the rules without the need for Engineering intervention. The system as a whole becomes more easily adaptable with such external operational rules. Some of the features for Rules engine include drag and drop experience for Rules engine through the UI, enhance engine capabilities by introducing custom functions without any deployments, expression builders for rules engine and rule debugging capabilities, and embedding artificial intelligence AI into rules engine.

In an exemplary embodiment the platform architecture provides form designer feature. The platform provides base-level code, scripts, and integrations so users can prototype, build, or scale applications without developing complex infrastructures. Both developers and non-developers can use this tool for rapid application development with customized workflows and functionality.

Further, the platform as a product advantageously enables citizen developer user to create end to end application with additional customized microservices and API deployed and configured in CDS. The developer creates application templates based on the operational verticals with predefined rules and workflows and database schema for out of box implementation. Third party implementation entities can select the application, customize and extend schema based on specific needs of customer region and line of operation. The platform has an ability create microservices and schema dynamic based on standard templates and customize layer. It supports real-time reporting with Inbuild capability to integrate with data lake for real-time integration with reporting solutions. The platform supports multiple communication protocols including but not limited to SOA, REST and gRPC (g Remote procedure call). It also supports dynamic and centralized state model and event handler for multiple action types i.e standard event handler and customized event handler for pre-event, event and post event. The platform auto-corrects and reverse transactions in case of failures.

In a related embodiment, the platform enables end to end flow. It enables selection of application type, configuration of data attributes as required for operation execution. The platform dynamically generates code clocks and database schema based on filed property like type and mandatory etc. Code and queries are generator based on column and repository type, translated using GEP Query language standardized for multiple data stores. System generates multiple user action types. Event types are generated based on state model and sequence on actions. Unique ID is generated for type. Event Types are mapped by dynamic code modular responsible for distributed transaction. Every transaction is tracked using Process ID and Event ID. Every Event has predefined Event Handler. Event Handlers can be configured and extended from portal. Some of the event types include AUTOSAVE, READ, INSERT/UPDATE, DELETE, APPROVE/REJECT, and CUSTOM ACTION. Further, every Action type has mandatory Event Handler blocks including PRE-EVENT, POST-EVENT, EVENT, SECURITY HANDLER and EXCEPTION HANDLER. Based on time interval system by default initiated defined code block to save data in repository. Transaction is saved in default state defined in initial step. Read event generated through canvas low code portal has following flow. Event ID mapped to code block responsible to fetch transaction based on underlying data repository using READ Code block. Transaction flows through 4 layers invoked using gRPC and API based model. READ Event Handler invokes security pre-event handler to validate user access control using roles/activities and user relation with transaction based on metadata and inter relation with other attributes. Access control application service is invoked using remote procedure call (RPC) protocol such as gRPC protocol at shared framework layer through process orchestrator. In example embodiment, the layered architecture includes application layer and pre-defined event handler, shared Framework layer for translating event handler and model information into standard format, other layers for translating transaction model into generic query language and translating the generic query language into data repository language.

In an exemplary embodiment, the present invention provides a bouncer API for Data Access Security. The API provides Decorator attribute on Event Handlers to support security-based rules. The rules are executed against hierarchical model based on Users relation with master data and application transaction.

In an exemplary embodiment, the platform of the present invention provides creation of Seed project that includes common repository and template project containing all metadata information and applications can be built on top using these templates. This will enable faster development of applications by multiple application development teams. Additional Features required to implement as part of Seed project include project repository as seed for all entity/end user implementations, manage all the entities from single manage interface to decide which entity is going to view what specific data, setting the permission and access control to the application development team to help them maintain and deploy their features and fixes faster and safer for Version control.

Figure 3:
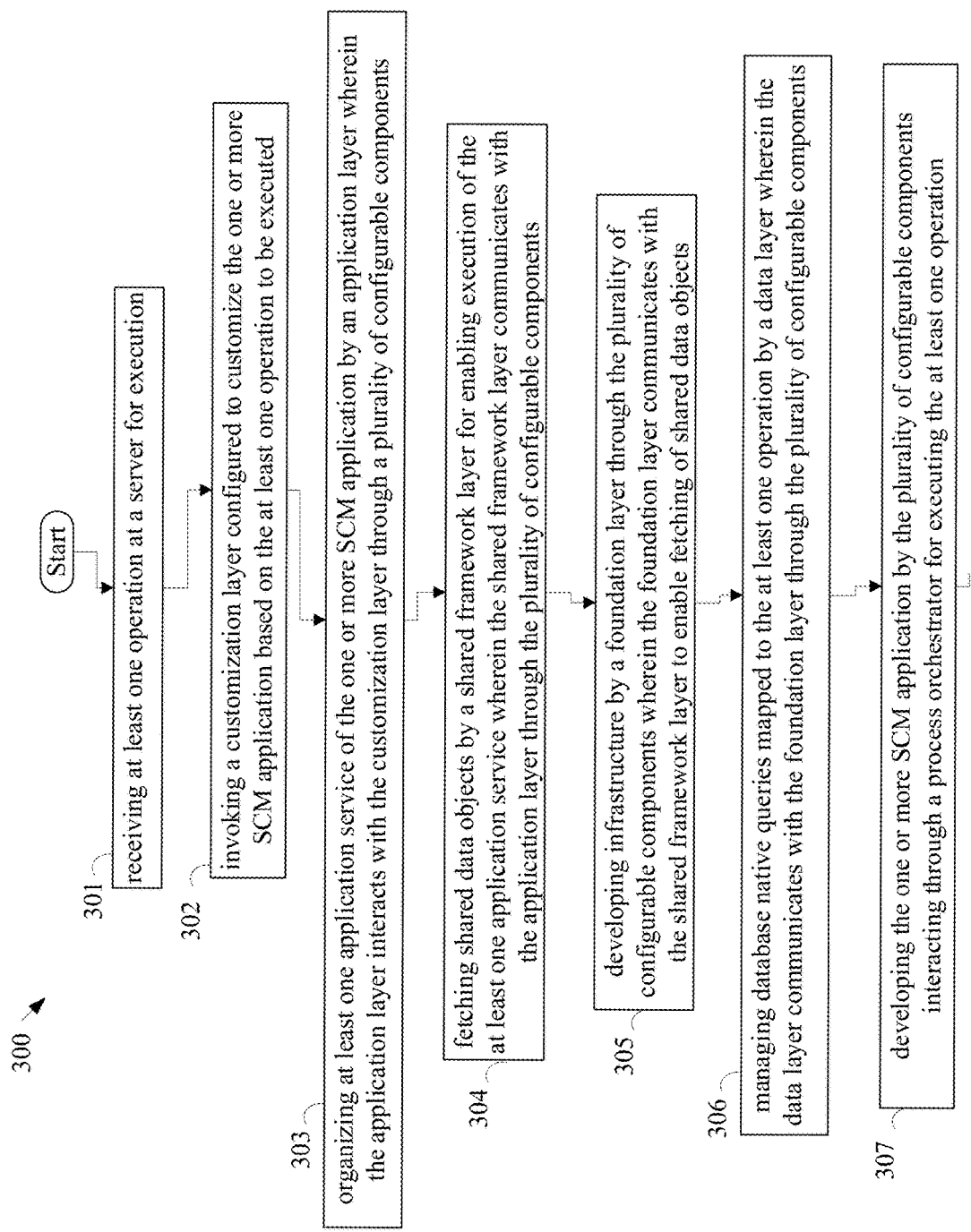
FIG. 3 is a flowchart depicting a method of codeless development of one or more SCM enterprise application in accordance with an embodiment of the invention.

Referring to FIG. 3 a flowchart 300 depicting a method of codeless development of one or more SCM enterprise application is shown in accordance with an embodiment of the invention. The method includes the steps of 301 receiving at least one operation at a server for execution. In step 302 invoking a customization layer configured to customize the one or more SCM application based on the at least one operation to be executed and in step 303 organizing at least one application service of the one or more SCM application by an application layer wherein the application layer interacts with the customization layer through a plurality of configurable components. In step 304 fetching shared data objects by a shared framework layer for enabling execution of the at least one application service wherein the shared framework layer communicates with the application layer through the plurality of configurable components. In step 305 developing infrastructure by a foundation layer through the plurality of configurable components wherein the foundation layer communicates with the shared framework layer to enable fetching of shared data objects. In step 306 managing database native queries mapped to the at least one operation by a data layer wherein the data layer communicates with the foundation layer through the plurality of configurable components and in step 307 developing the one or more SCM application by the plurality of configurable components interacting through a process orchestrator for executing the at least one operation.

In an embodiment, the method includes identifying the configurable components for structuring one or more SCM application UI, creating rules and creating processing logic for executing the at least one operation.

In an embodiment, the at least one operation includes creation of one or more SCM application operation including CLM, Inventory management, warehouse management, Cycle Counting, Material transfer, Pick List, warehouse management, Order Management, invoice management, Good Receipts, Credit Memo, service confirmation and timesheet, Goods Issue, Return Note, requisition, Demand and Supply planning, Vendor Performance and Risk Management, RFX, Auction, Project Management, Quality management, Forecast Management, cost modelling, purchase order and sales management, receivables, work order management, Supplier Order Collaboration, Control Tower, Budgeting, Item and Catalog Management.

In an exemplary embodiment, the method of the invention includes generating a plurality of fixtures created for performing the at least one operation by utilizing a library of functions stored on a functional database where a controller is encoded with instructions enabling the controller to function as a bot for generating the fixtures. The plurality of fixtures are backend scripts created by the bot based on the at least one operation, data objects and AI processing for enabling automation of the operation by the controller of the process orchestrator. The AI based processing includes a processing logic that integrates deep learning, predictive analysis, information extraction, planning, scheduling, optimization and robotics for processing the at least one operation by the process orchestrator.

Figure 4:
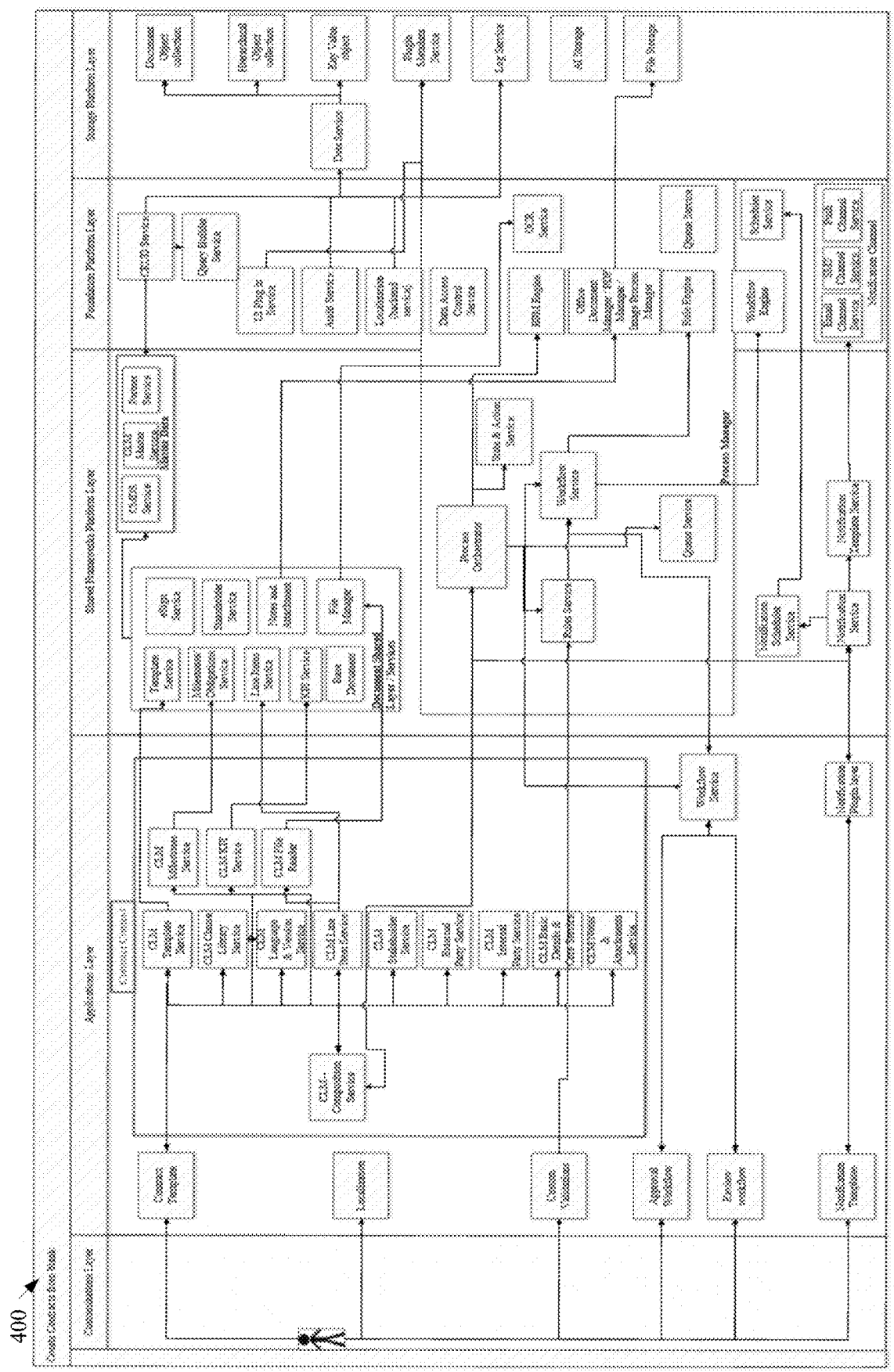
FIG. 4 is a flow diagram of create contract operation of a contract lifecycle management application in accordance with an embodiment of the invention.

Referring to FIG. 4, the flow diagram 400 depicting codeless development of a create contract operation of a contract lifecycle management (CLM) SCM enterprise application is shown in accordance with an ex ample embodiment of the invention. The flow diagram explains the flow as: a) User clicks on Create Contract and passes the type of Contract like stored/authoring to UI Plug in Service; b) UI Plugin Service picks up the right template configured using template service; c) Once user Saves Contract CLM Composite Service performs customer specific validations, orchestrate and manages Contract Stages and State with the help of Process Orchestrator & Saves the CLM Data Model via CLM Specific Micro-Services; d) CLM Basics Service, Internal Party Service, External Party Service, Contract Language Service, Clause Library Service, Line Items Service contains CLM specific business objects and business logic; e) CLM File reader Service, CLM Notes and Attachment Service, CLM Stake Holder Service, CLM Milestones, CLM KPI Services contains CLM specific business logic and also share the objects with Document Shared Layer/services (Part of shared platform layer); f) Process Orchestrator interacts with Platform components like BPM Engine, Rule Engine, State Service to manage the client configured business flows; g) Process Orchestrator is also responsible for routing Contract for Review, Approval Flows, document state & event and time-based notifications by invoking Notification Services; h) Data Security of all the APIs happens with the help of Access control Services.

In an exemplary embodiment, the platform architecture provides contract lifecycle management (CLM) composite service. The CLM Composite Service is domain gateway API for collection of CLM services. Composite Service act as a Single dependency on all Upstream Services than dependencies on several Down Stream Services. The CLM User interface (UI) is dependent on single touch point than invoking multiple APIs for Single Save Operation. The composite Service Collects Composite View Model from UI Plugin and the service transforms the view model into entity model and call all the required microservices. Further, the Service is responsible for performing operational Validations (needs composite object) for all incoming data & managing post save operations with the help of Process orchestrator. The Composite service may be deployed as a Proxy depending on data load and can logically divide the incoming traffic and the Service will also take data from other sources like Mobile App or exposing CLM data to third party applications including cloud integration platforms.

Figure 4A:
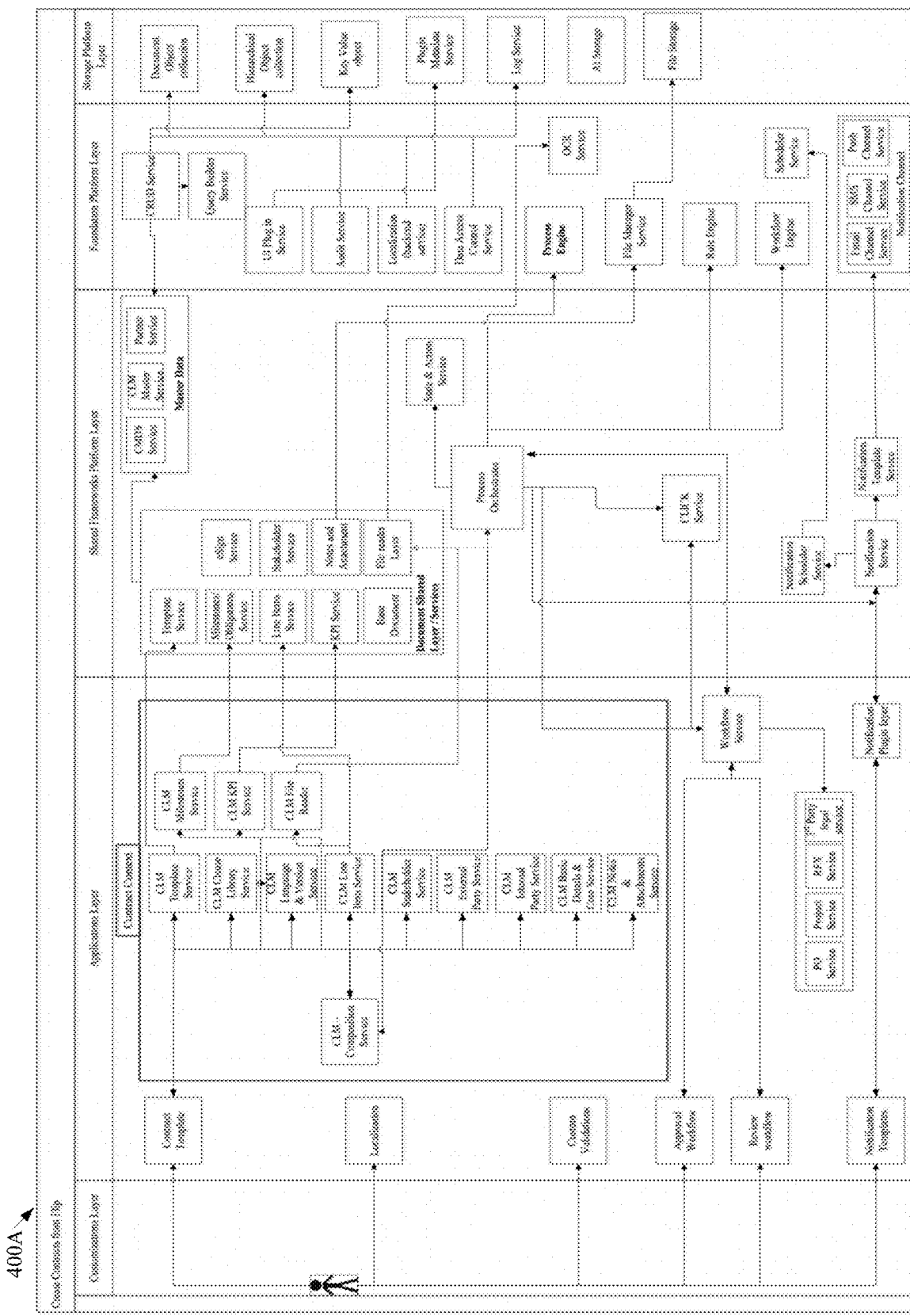
FIG. 4A is a flow diagram of flip contract operation of a contract lifecycle management application in accordance with an embodiment of the invention.

Referring to FIG. 4A, a flow diagram 400A depicting codeless development of a flip contract operation of a contract lifecycle management SCM enterprise application is shown in accordance with an example embodiment of the invention. The flow diagram explains the flow as: a) User clicks on Flip Contract and passes the type of Contract stored/authoring to UI Plug in Service; b) UI Plugin Service picks up the right template configured using template service; c) Once user flips Contract CLM Composite Service performs, transformation of object, customer specific validations, orchestrate and manages Contract Stages and State with the help of Process Orchestrator & Saves the CLM Data Model via CLM Specific Micro Services; d) Process Orchestrator interacts with Platform components like BPM Engine, Rule Engine, State Service to manage the configured business flows; e) CLM Basics Service, Internal Party Service, External Party Service, Contract Language Service, Clause Library Service, Line Items Service contains CLM specific business objects and business logic; f) CLM File reader Service, CLM Notes and Attachment Service, CLM Stake Holder Service, CLM Milestones, CLM KPI Services contains CLM specific business logic and also share the objects with Document Shared Layer/services (Part of shared platform layer); g) Process Orchestrator is also responsible for routing Contract for Review, Approval Flows, document state & event and time-based notifications by invoking Notification Services; h) data Security of all the APIs happens with the help of Access control Services.

Figure 4B:
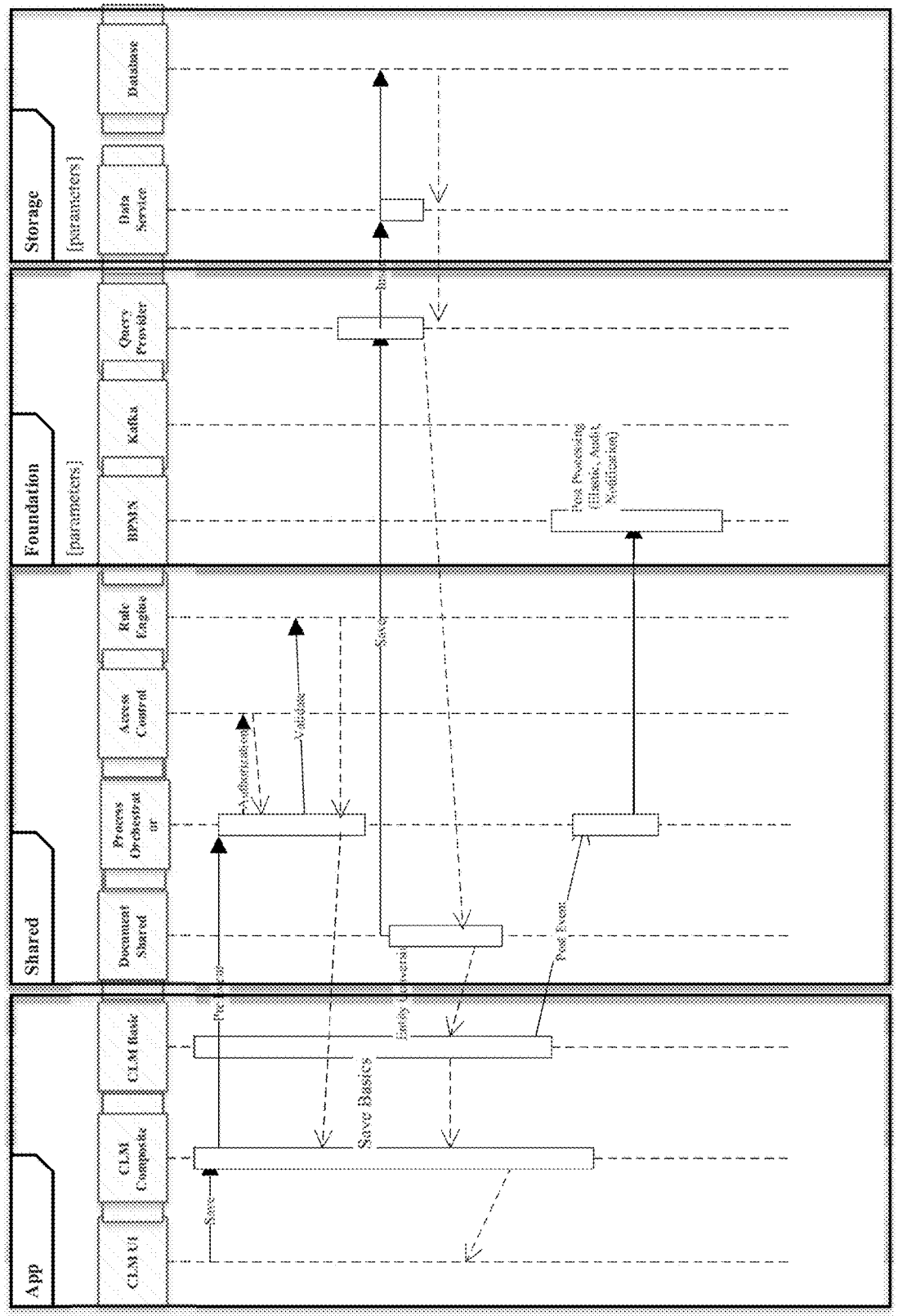
FIG. 4B is a flow diagram of create contract object flow operation of a contract lifecycle management application in accordance with an embodiment of the invention.

Referring to FIG. 4B, a flow diagram 400B depicting codeless development of a create contract object flow operation of a contract lifecycle management SCM enterprise application is shown in accordance with an example embodiment of the invention. The flow diagram explains the flow as: a) User clicks on Save Document from CLM UI Plugin; b) CLM UI Plugin pass the CLM Object to CLM Composite; c) CLM Composite Invokes the Process Orchestrator through Pre-Event; d) Process Orchestrator checks the document access control, persona-based rights via Access Control Service; e) Process orchestrator validates the CLM objects via Business Rules configured Rule Engine; f) Once all the Pre-Checks are Done CLM Composite Invokes Save process by passing Bounded Context of each CLM Service like CLM Basic Service etc., g) CLM Basic Service Invokes Document Shared which internally transforms the view model in data Entity and invokes Platform Query Provider Service; h) Query Provider service construct the Query in GQL (Gep Query language) and invokes Data service for Saving Data in Data Storage; i) Success object is sent to UI Plugin for Save Confirmation; j) Post Event is invoked as Asynchronous Post Processing flow via process management Engine (like a business process management engine) for processing like Elastic Search Indexing, State Management, Notification etc.

In an embodiment, the platform architecture provides service fault tolerance. The platform supports Composite Service to implement Orchestrator Based SAGA pattern for distributed transactions. The platform includes centralized Controller (CLM Composite) Orchestrating the Transactions. The Controller Queues the requests in Messaging Queue with same correlation id. All the subscribers execute the messages in Queue. Once all the transactions are successful Contract Transaction commits save. The process orchestrator handles the failure through compensating transaction. All the services implement time Outs and retry (Polly Framework) policies.

In a related embodiment, the contract lifecycle management application supports asynchronous occurrence of all post save operations, consumption of platform services by gRPC connection, addition of redundant data in local cache to serve request faster, application of local cache policy at client side. Further, a write operation on Contract happens only in specific Stages till Contract is not live as read write operations can happen through Transactional Store. At a given time most of the Contracts are in Active state which Read-only state for such contracts data can be read through archived Store. Above retention Policy & CQRS (command query responsibility segregation) pattern reduces Transactional Load on system.

Figure 5:
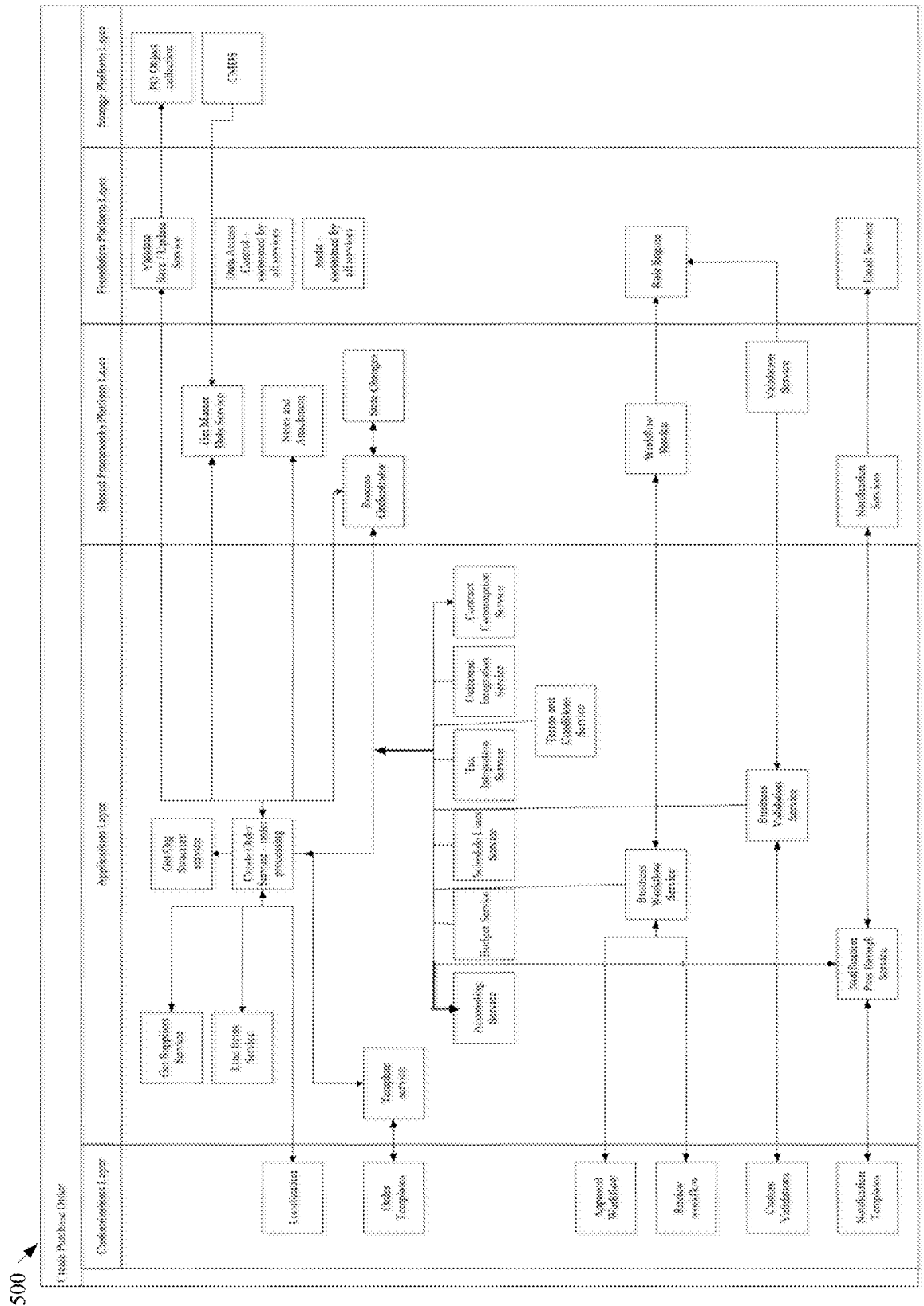
FIG. 5 is a flow diagram of create purchase order operation of a SCM enterprise application in accordance with an embodiment of the invention.

Referring to FIG. 5, the flow diagram 500 depicting codeless development of a create purchase order operation of a SCM enterprise application is shown in accordance with an example embodiment of the invention. The flow diagram explains the flow as: a) User clicks on create purchase order action; b) "CreateOrderService" is invoked; c) "CreateOrderService" as a first step calls the "DataAccesscontrolservice" to confirm that the user has access to perform the creation order action; d) "CreateorderService", then invokes "localizationservice", to get the necessary localization attributes like language, date formats, address formats; e) On success calls, "GetOrgstructureService" which based on the domain configuration and user profile brings order specific header entities from CMDS; f) On success, "GetCustomerService" which provides the list of customers and related information to the "CreateOrderService" which are bound to the UI fields; g) On success calls, "GetMasterDataService" which provides the list of all the required master data like ship to, bill to addresses, state, zip, etc; h) On success calls, "LineItemsService" which in turn calls a multitude of services like DAC, master data, custom attribute, etc., and takes the responsibility of rendering the basic line section; i) The sequence of the above service interactions is controlled through "BusinessProcessOrchestrationService" (uses "ProcessOrchestratorService"); j) Basic order is now complete; k) depending on the "Document Type" selection, "CreateOrderService" passes the control to "ProcessOrchestrator" which based on the configuration invokes the "TemplateService" which in turn looks at the configured list of templates and picks the purchase order template configured for that domain; l) "CreateOrderService" gets the template and binds it in the UI using additional set of services; m) based on the configuration and the template subsequent services like "AccountingService" (will provide chart of accounts and make Ledger liability entry), Schedule lines/Promise lines Services (create schedules/promises); n) "CreateOrderService" will then invoke the validation service to run user defined UI validations; o) On success, the "CreateOrderService" will invoke the "SaveOrderService", which will invoke the data layer for writing to the backend; p) Once the required order object is created, "CreateOrderService" will invoke "BusinessProcessOrchestrationService" to determine the next steps, since this is a sales order the next step is to route for reviews internally, Process orchestrator (PO) will invoke the "WorkflowService" which in turn will use the rule engine on the backend and the configured rules from the customization layer to determine who the order needs to be routed to; q) On success, PO will invoke workflow service for running approvals; r) On success, since this is a purchase order, process orchestrator will invoke the "Fulfillmentservice" and "ASNService".

Figure 5A:
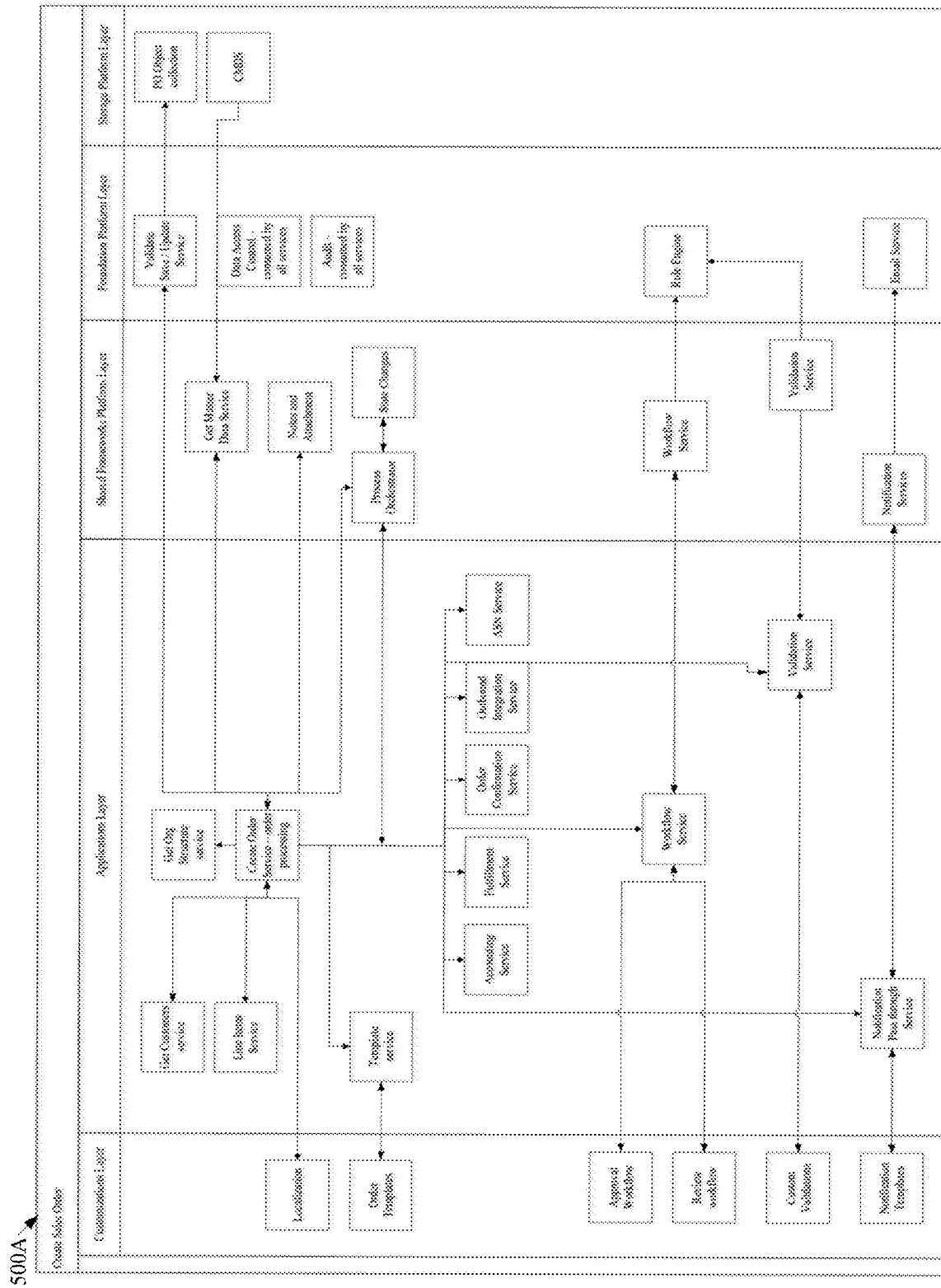
FIG. 5A is a flow diagram of create sales order operation of a SCM enterprise application in accordance with an embodiment of the invention.

Referring to FIG. 5A, the flow diagram 500 depicting codeless development of a create sales order operation of a SCM enterprise application is shown in accordance with an example embodiment of the invention. The flow diagram explains the flow as: a) User clicks on create sales order action; b) "CreateOrderService" is invoked; c) "CreateOrderService" as a first step calls the "DataAccesscontrolservice" to confirm that the user has access to perform the creation sales order action; d) "CreateorderService", then invokes "localizationservice", to get the necessary localization attributes like language, date formats, address formats; e) On success calls, "GetOrgstructureService" which based on the domain configuration and user profile brings sales order specific header entities from CMDS; f) On success, "GetCustomerService" which provides the list of customers and related information to the "CreateOrderService" which are bound to the UI fields; g) On success calls, "GetMasterDataService" which provides the list of all the required master data like ship to, bill to addresses, state, zip, etc; h) On success calls, "LineItemsService" which in turn calls a multitude of services like DAC, master data, custom attribute, etc., and takes the responsibility of rendering the basic line section; i) the sequence of the above service interactions is controlled through "BusinessProcessOrchestrationService" (uses "ProcessOrchestratorService"); j) Basic order is now complete; k) depending on the "Document Type" selection, "CreateOrderService" passes the control to "ProcessOrchestrator" which based on the configuration invokes the "TemplateService" which in turn looks at the configured list of templates and sales order template configured for that domain; l) "CreateOrderService" gets the template and binds it in the UI using additional set of services; m) based on the configuration and the template subsequent services like "AccountingService" (will provide chart of accounts and make Ledger liability entry), Schedule lines/Promise lines Services (create schedules/promises); n) "CreateOrderService" will then invoke the validation service to run user defined UI validations; o) On success, the "CreateOrderService" will invoke the "SaveOrderService", which will invoke the data layer for writing to the backend; p) Once the required order object is created, "CreateOrderService" will invoke "BusinessProcessOrchestrationService" to determine the next steps, since this is a sales order the next step is to route for reviews internally, PO will invoke the "WorkflowService" which in turn will use the rule engine on the backend and the configured rules from the customization layer to determine who the order needs to be routed to; q) On success, PO will invoke workflow service for running approvals; r) On success, since this is a sales order, PO will invoke the "Fulfillmentservice" and "ASNService".

Figure 5B:
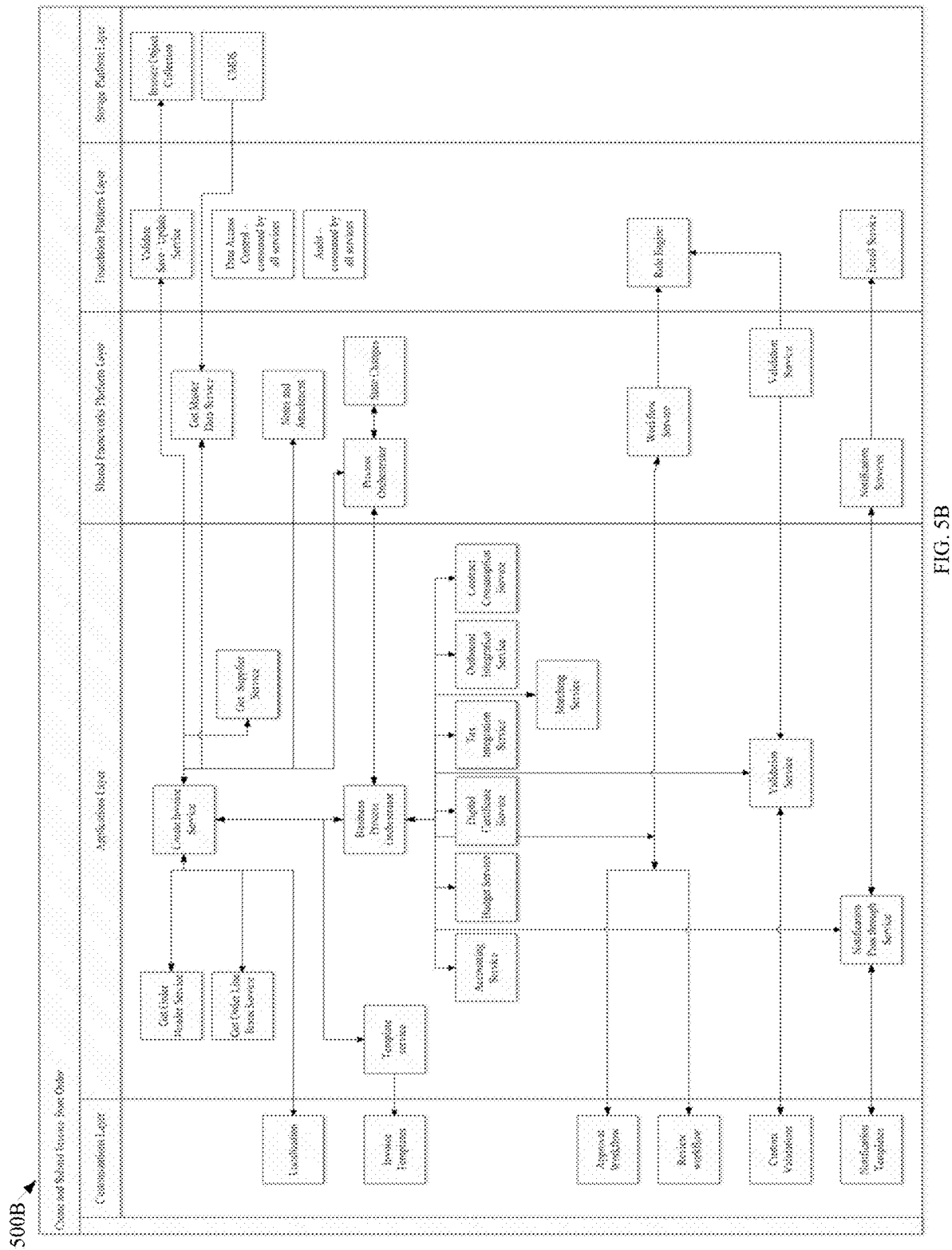
FIG. 5B is a flow diagram of creating and submitting invoice from order operation of a SCM enterprise application in accordance with an embodiment of the invention.

Referring to FIG. 5B, the flow diagram 500B depicting codeless development of a create and submit invoice from order operation on buyer side user of a SCM enterprise application is shown in accordance with an example embodiment of the invention. The flow diagram explains the flow as: a) User clicks on "Create Invoice" or flips the order to an invoice; b) "CreateInvoiceService" calls the template service to determine which template to be invoked based on the configuration (country/Line of business etc.,); c) On success "CreateInvoiceService" invokes the "GetOrderHeaderService" and "GetOrderLineService" and binds it based on the Invoice template; d) On success "CreateInvoiceService", uses the "GetSupplierService" to populate additional information like remit to locations, ship from locations etc., which are required for tax integration services; e) On success, depending on the template additional services like "TaxIntegrationService" is invoked; f) On success, the invoice object is stored using the "ValidateSave" Service; g) On success and on submission, the "BusinessProcessOrchestrator" invokes "BusinessWorkflowService" which triggers an invoice review workflow based on the configuration. (this is needed mostly for European invoices where items like commodity codes, and VAT codes are validated by the AP agents before it goes into matching); h) On success from the invoice review flow "MatchingService" (explained in the next section); i) On success back from "MatchingService", "BusinessProcessOrchestrator" invokes services like "BudgetService", "ContractConsumptionService", "DigitalCertificationService" to make corresponding updates to budgets, and contract consumption.

Figure 5C:
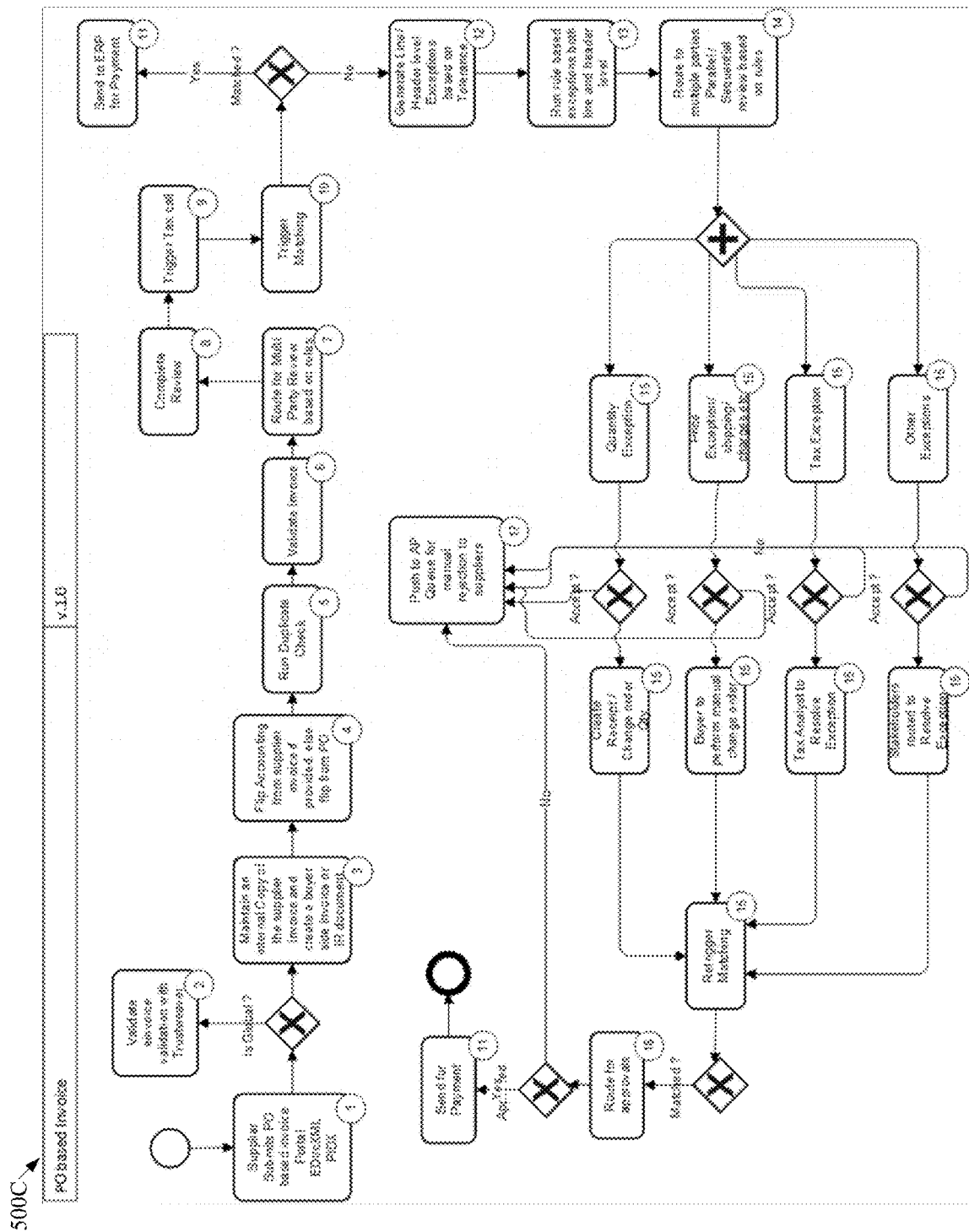
FIG. 5C is an invoice design flow diagram depicting purchase order invoice in accordance with an embodiment of the invention.

Referring to FIG. 5C, an invoice design flow diagram 500C depicting Purchase order invoice is shown in accordance with an embodiment of the invention.

Figure 5D:
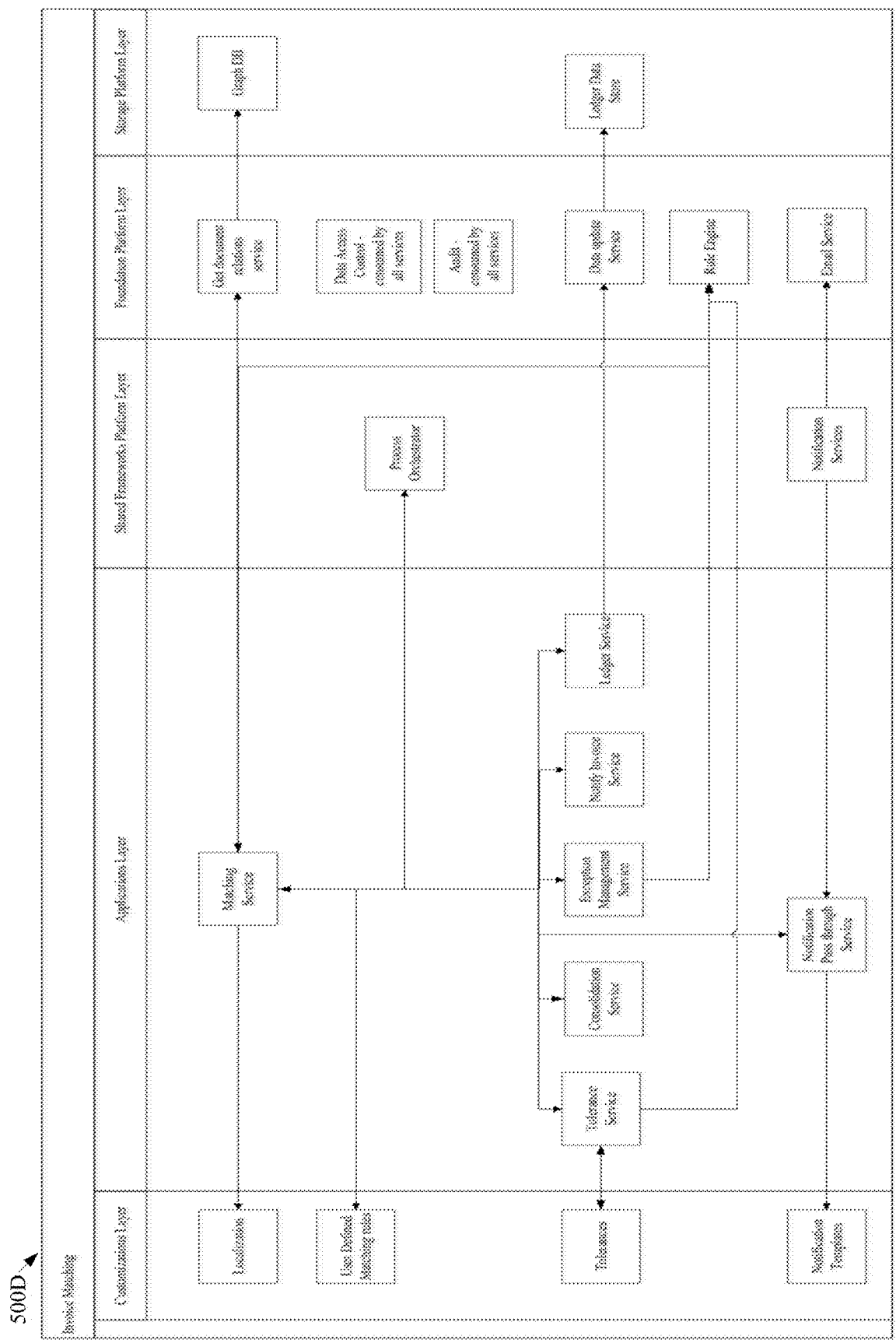
FIG. 5D is a flow diagram of invoice matching operation of a SCM enterprise application in accordance with an embodiment of the invention.

Referring to FIG. 5D, the flow diagram 500D depicting codeless development of an invoice matching operation of a SCM enterprise application is shown in accordance with an example embodiment of the invention. The flow diagram explains the flow as: a) "MatchingService" is invoked by the invoice and passed attributes like match type (2 way, 3 way or 4 way), document type (in this case invoice) or additional attributes which determines additional documents to be matched if needed; b) based on the match type and the incoming document type and the attributes, the relations between the necessary documents are retrieved from the "GetrelateddocumentsService"; c) On Success, "BusinessProcessOrchestrator" invokes the "ToleranceService" which uses the tolerances set up for that domain; d) On Success, "BusinessProcessOrchestrator" invokes the "Consolidationservice" which takes the related documents and pulls the necessary details like quantity, unit price, shipping charges, taxes etc., consolidates historical data and gives it back to the "MatchingService"; e) On Success, "MatchingService" uses the rule Engine to run the matching rules; f) If the matching results are negative "ExceptionManagementService" is invoked; g) If the matching results are positive "LedgerService" is Invoked to update the accounting Ledger data; h) On success, the "NotifyInvoiceService" is invoked to pass the control back to invoice document.

Figure 5E:
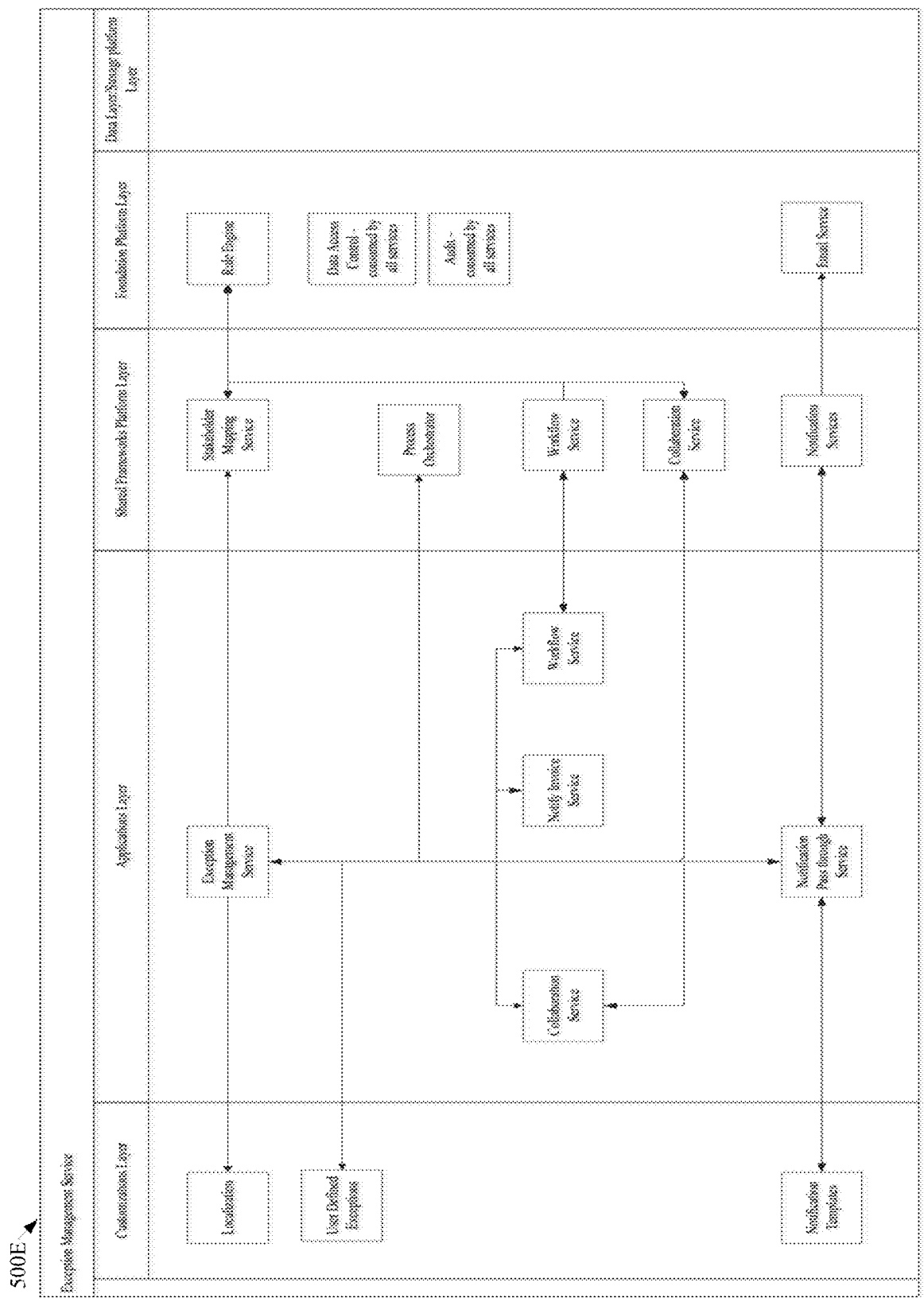
FIG. 5E is a flow diagram of exception management operation of a SCM enterprise application in accordance with an embodiment of the invention.

Referring to FIG. 5E, the flow diagram 500D depicting codeless development of an exception management operation of a SCM enterprise application is shown in accordance with an example embodiment of the invention. The flow diagram explains the flow as: a) "ExceptionManagementService" uses the "StakeholderMappingService" to determine the stakeholders and the corresponding exception mapping; b) It invokes the "CollaborationService" to allow selective edits to the invoice based on the exception; c) It also invokes the "workflowService" to manage the routing to the stakeholders; d) On successful resolution "NotifyInvoiceService" is invoked to give the control back to the invoice object.

In an exemplary embodiment, the application user interface of the platform architecture may enable cognitive computing to improve interaction between a user and the enterprise application(s). The intelligent interface provides insight into dynamically changing parameters for execution of operation in SCM application.

In an advantageous aspect, the Platform architecture and development application framework of the present invention enable Sourcing, Procurement and Supply Chain to create applications with industry seed projects having set of rules and workflow, process flow for various industries like Oil & Gas, FMCG, Finance etc. Platform offers functional group to configure and customize the applications in different areas with ability to define screen layout and sections as per form template types, ability to configure themes and icons as per customer choice, ability to populate labels and data elements per users' culture and context and Ability to configure rules. The rule configuration includes mandatory field validation, dependent attributes validation and Parent Child fields, Custom Expression to define field behavior as per state model and action types, operational validations using aggregation and computation logic. The platform introduces multiple action types, document states using state machine and state model. Further, the platform architecture includes task/operation service manager integrated with process engine and workflow through process orchestrator. The platform support multiple data stores, establishes network of entities, actors and relation of actors with operational objects. The Customization layer enables implementation users to extend code and deploy the code in application server.

In another advantageous aspect, the platform is extensible which enables more opportunities for extending the platform and build applications based on end user requirements. The data is segregated into multiple MicroDBs which makes identification of data points and relation across models difficult. The platform architecture supported by enterprise Data Network enables the SCM applications to trace and identify relations across multiple entities and actors e.g. Supplier->location->document->item->master data etc. Some of the features include recommendation engine and knowledge based search, access Control policies, analytics on entities, identification of impact analysis in data nodes due to change in new master nodes e.g introduce new category, merge category nodes, Validation engine incase of master data change and master data management.

The present invention uses Artificial intelligence, process orchestration and layered platform architecture where the entire operational logic in the service is transformed into engine reducing complex logic. The sequence flow is translated in the engine. It is very helpful to manage multitenant applications. Simulators also help to unit test the flow not only with in the bounded context but across applications with registered in the flow. The Platform architecture provides building highly scalable services. The platform includes both backend and frontend components (UI components, rules engine and workflow) being built from scratch. Platform offers productivity gain and accelerates implementation cycle. The platform empowers functional admin to configure UI, add fields, layouts, rule engine and workflows without development efforts. The single page application framework provides better user experience, ability to configure localization and theming from admin portal without engineering support.

In an exemplary embodiment, the present invention may be a platform architecture, application framework, system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

The invention claimed is:

1. A development application framework for codeless development of one or more Supply chain management (SCM) applications, the application framework comprising:
   at least one memory having an application user interface (UI), an entity configurator, a database query engine, a configurable data source repository, an expression builder and a plugin creator engine; and
   at least one processor configured to:
   trigger, by a plurality of data objects, a plurality of configurable components of a layered platform architecture to structure the one or more SCM applications;
   define by the entity configurator a plurality of configuration parameters to create the one or more SCM applications;
   fetch data from a plurality of distinct databases through the database query engine;
   store, in the configurable data source repository, a plurality of APIs configured to be invoked dynamically by a user through the application user interface (UI) for creating the one or more SCM applications;
   customize application processing logic by the expression builder for execution of at least one SCM application operation; and
   implement, using the plugin creator, a plurality of reusable plugins for enriching the layered platform architecture, wherein the layered platform architecture includes a customization layer, an application layer, a shared framework layer, a foundation layer, and a data layer, wherein the customization is configured to customize the one or more SCM applications based on the at least one SCM application operation to be executed and wherein a SCM application end user triggers and interacts with the customization layer for execution of the least one SCM application operation, a citizen developer user triggers and interacts with the application layer to develop the one or more SCM applications for execution of the least one SCM application operation, and a platform developer interacts with the shared framework layer, the foundation layer and the data layer to structure the layered platform architecture for enabling codeless development of SCM applications, where communication between the layers is performed through one or more configurable components of the plurality of configurable components.

2. The application framework of claim 1 further comprising;
a process orchestrator configured to enable interaction of the plurality of configurable components in the layered platform architecture for executing the at least one SCM application operation and develop the one or more SCM application, wherein
the application layer is configured for interacting with the customization layer through one or more configurable components of the plurality of configurable components wherein the application layer is configured to organize at least one application service of the one or more SCM applications;
the shared framework layer is configured for communicating with the application layer through one or more configurable components of the plurality of configurable components wherein the shared framework layer is configured to fetch shared data objects for enabling execution of the at least one application service;
the foundation layer is configured for infrastructure development through one or more configurable components of the plurality of configurable components wherein the foundation layer communicates with the shared framework layer for enabling fetching of shared data objects; and
the data layer is configured for communicating with the foundation layer through one or more configurable components of the plurality of configurable components wherein the data layer is configured to manage database native queries mapped to the at least one SCM application operation.

3. The application framework of claim 2, wherein the process orchestrator coupled to a processor executes the at least one SCM application operation by at least one data model wherein an AI engine transfers processed data to the UI for visibility, exposes SCM operations through API and assists a manager for orchestration and control.

4. The application framework of claim 3, wherein the process orchestrator further comprises a blockchain connector configured for integrating blockchain services with the one or more SCM applications.

5. The application framework of claim 4, wherein a remote procedure call (RPC) protocol invokes an access control application service at the shared framework layer through process orchestrator.

6. The application framework of claim 1, wherein the application user interface (UI) includes a UI form builder component to structure one or more SCM applications for executing one or more SCM operations by a SCM application end user through a SCM application UI.

7. The application framework of claim 6, wherein the plurality of APIs are configured to interact with the application framework wherein an AI based processing logic integrates deep learning, predictive analysis, information extraction and robotics for triggering a dynamic data object injector to conditionally load the plurality of data objects on the SCM application UI thereby processing the one or more SCM application operation.

8. The application framework of claim 7 wherein the dynamic data object injector includes:
at least one data object module configured for conditionally loading on the application UI;
an identifier associated with the at least one data object module wherein the identifier is triggered based on at least one protocol generated by an AI engine coupled to a processor and based on an AI based processing logic in response to receiving the at least one SCM application operation at a server to be executed; and
a data model associated with the identifier and a plurality of metadata stored in a data repository wherein the at least one data object module interacts with the plurality of configurable components of the layered platform architecture based on the at least one SCM application operation for structuring the one or more SCM application.

9. The application framework of claim 8, wherein one of the plurality of configurable component is a rule engine configured for creating and modifying processing rules to execute the at least one SCM application operation wherein the rule engine enables processing of validation actions, decision making, workflow processes, operational customization, and exceptional routing based on operational requirement.

10. A method of codeless development of one or more SCM applications by a development application framework, the method comprising:
receiving, at a server, a request to execute at least one SCM application operation;
identifying, by an AI engine coupled to a processor, a plurality of configurable components of a layered platform architecture for structuring the one or more SCM applications to execute the at least one SCM application operation;
defining, by an entity configurator, a plurality of configuration parameters to create the one or more SCM applications;
fetching data from a plurality of distinct databases by a database query engine;
registering a plurality of APIs for storing at a configurable data source repository, wherein the plurality of APIs are configured to be invoked dynamically by a SCM application user through an SCM application user interface (UI) for creating the one or more SCM applications;
customizing application processing logic by an expression builder for execution of the at least one SCM application operation;
implementing a plurality of reusable plugins by a plugin creator engine for enriching the layered platform architecture; and
developing the one or more SCM applications by the plurality of configurable components interacting through a process orchestrator for executing the at least one SCM application operation, wherein the layered platform architecture includes a customization layer, an application layer, a shared framework layer, a foundation layer, and a data layer, wherein the customization layer is configured to customize the one or more SCM applications based on the at least one SCM application operation to be executed and wherein a SCM application end user triggers and interacts with the customization layer for execution of the at least one SCM application operation, a citizen developer user triggers and interacts with the application layer to develop the one or more SCM applications for execution of the at least one SCM application operation, and a platform developer interacts with the shared framework layer, the foundation layer and the data layer to structure the layered platform architecture for enabling codeless development of SCM applications, where communication between the layers is performed through one or more configurable components of the plurality of configurable components.

11. The method of claim 10, wherein the configuration parameters include SCM application data, data types, representation and configuration processing logics.

12. The method of claim 11, wherein an application user interface (UI) of the development application framework includes a plurality of data objects configured to trigger the plurality of configurable component of the layered platform architecture to create the one or more SCM application.

13. The method of claim 12, wherein an API is configured to interact with the application framework wherein an AI based processing logic integrates deep learning, predictive analysis, information extraction and robotics for triggering a dynamic data object injector to conditionally load the plurality of data objects on the SCM application UI thereby processing the one or more SCM application operation.

14. The method of claim 13, wherein the dynamic data object injector includes:
at least one data object module configured for conditionally loading on the application UI;
an identifier associated with the at least one data object module wherein the identifier is triggered based on at least one protocol generated by the AI engine coupled to a processor and based on an AI based processing logic in response to receiving the at least one SCM application operation at a server to be executed; and
a data model associated with the identifier and a plurality of metadata stored in a data repository wherein the at least one data object module interacts with the plurality of configurable components of the layered platform architecture based on the at least one SCM application operation for structuring the one or more SCM application.

15. The method of claim 14, wherein the at least one object module is a widget module injected into a application UI/dynamic object module (DOM) with configuration and a scope data of widget wherein the scope data is associated with a user work profile, user activity and the operation.

16. The method of claim 15, wherein the widget module includes objects to add field, add grid, set data element properties, drag and drop filed, through the widget module.

17. The method of claim 16, further comprises the step of defining custom fields and standard fields for the application UI wherein the standard fields are application specific fields required while structuring the one or more SCM application to accomplish nature of the one or more SCM application and the custom fields are operational requirement specific fields.

18. The method of claim 14, wherein the identifier is an element of the injector associated to a code of the protocol and configured for uniquely identifying the module to be triggered by the AI engine.

19. The method of claim 10, wherein customizing application processing logic includes setting relation between data elements, setting UI interaction based on end user inputs, hiding-showing and enabling-disabling fields and widgets dynamically, validating data elements and updating/resetting inputs to execute the at least one SCM application operation.

20. A computer program product for codeless development of one or more supply chain management (SCM) application of a computing device with memory, the product comprising:
a computer readable storage medium readable by a processor and storing instructions for execution by the processor for performing a method, the method comprising:
receiving at a server, a request to execute at least one SCM application operation;
identifying by an AI engine coupled to a processor, a plurality of configurable components of a layered platform architecture for structuring one or more SCM applications to execute the at least one SCM application operation;
defining by an entity configurator, a plurality of configuration parameters to create the one or more SCM applications;
fetching data from a plurality of distinct databases by a database query engine;
registering a plurality of APIs for storing at a configurable data source repository, wherein the APIs are configured to be invoked dynamically by a SCM application user through an SCM application user interface (UI) for creating the one or more SCM applications;
customizing application processing logic by an expression builder for execution of the at least one SCM application operation;
implementing a plurality of reusable plugins by a plugin creator engine for enriching the layered platform architecture; and
developing the one or more SCM applications by the plurality of configurable components interacting through a process orchestrator for executing the at least one SCM application operation, wherein the layered platform architecture includes a customization layer, an application layer, a shared framework layer, a foundation layer, and a data layer, wherein the customization layer is configured to customize the one or more SCM applications based on the at least one SCM application operation to be executed and wherein a SCM application end user triggers and interacts with the customization layer for execution of the at least one SCM application operation, a citizen developer user triggers and interacts with the application layer to develop the one or more SCM applications for execution of the at least one SCM application operation and a platform developer interacts with the shared framework layer, the foundation layer and the data layer to structure the layered platform architecture for enabling codeless development of SCM applications, where communication between the layers is performed through one or more configurable components of the plurality of configurable components.

* * * * *